US012791671B2

(12) United States Patent
Qiu et al.

(10) Patent No.: US 12,791,671 B2
(45) Date of Patent: Nov. 10, 2026

(54) OPTICAL EMITTING DEVICE AND OPTICAL SENSOR

(71) Applicant: SUTENG INNOVATION TECHNOLOGY CO., LTD., Shenzhen (CN)

(72) Inventors: Zhengren Qiu, Shenzhen (CN); Jiachao Zhang, Shenzhen (CN); Hongju Li, Shenzhen (CN); Peng Wang, Shenzhen (CN); Kaipeng Zhang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1066 days.

(21) Appl. No.: 17/963,981

(22) Filed: Oct. 11, 2022

(65) Prior Publication Data

US 2023/0109942 A1 Apr. 13, 2023

(30) Foreign Application Priority Data

Oct. 13, 2021 (CN) .......................... 202111196361.4
May 20, 2022 (CN) .......................... 202210560905.9
Jul. 8, 2022 (CN) .......................... 202210808010.2

(51) Int. Cl.
*G01S 7/481* (2006.01)

(52) U.S. Cl.
CPC .......... *G01S 7/4814* (2013.01); *G01S 7/4816* (2013.01)

(58) Field of Classification Search
CPC ...... G01S 7/4814; G01S 7/4816; G01S 7/481; G01S 7/4811; G01C 15/002
See application file for complete search history.

(56) References Cited

U.S. PATENT DOCUMENTS

D826,746 S * 8/2018 Qiu ................................ D10/61
11,592,553 B2 * 2/2023 Qiu ....................... G01S 7/4868
(Continued)

FOREIGN PATENT DOCUMENTS

CN 112666704 A 4/2021
JP 2005156989 * 6/2005

OTHER PUBLICATIONS

First Office Action of the Chinese application No. 202111196361.4, issued on Aug. 28, 2023. 7 pages.
(Continued)

*Primary Examiner* — Daniel I Walsh
(74) *Attorney, Agent, or Firm* — BAYES PLLC

(57) ABSTRACT

An optical emitting device and an optical sensor are provided. The optical emitting device includes a body, a light source, and a first light-blocking structure. The body has an emitting cavity extending in a first preset direction. The emitting cavity has an incident light port and an emergent light port that are arranged in the first preset direction. An inner wall of the emitting cavity has a first inner wall portion and a second inner wall portion. The first inner wall portion and the second inner wall portion are oppositely arranged. The light source and the body are arranged in the first preset direction. The first light-blocking structure is arranged in the first inner wall portion of the emitting cavity. A light-transmitting channel is arranged between the first light-blocking structure and the second inner wall portion. The first light-blocking structure includes a plurality of first light-blocking sheets.

4 Claims, 24 Drawing Sheets

(56) References Cited

U.S. PATENT DOCUMENTS

| | | | | |
|---|---|---|---|---|
| 11,650,297 | B2 * | 5/2023 | Qiu | G01S 17/10<br>356/5.01 |
| 12,481,033 | B1 * | 11/2025 | Zhou | G01S 17/42 |
| 2006/0093262 | A1 * | 5/2006 | Matsumoto | G01N 21/7703<br>385/12 |
| 2007/0263289 | A1 * | 11/2007 | Monoe | G03B 21/10<br>359/599 |
| 2012/0199728 | A1 * | 8/2012 | Momtahan | G06F 3/042<br>250/221 |
| 2013/0327931 | A1 * | 12/2013 | Hsu | G01S 17/04<br>250/237 R |
| 2016/0223165 | A1 * | 8/2016 | Feng | F21V 29/70 |
| 2018/0335607 | A1 * | 11/2018 | Lin | G02B 7/021 |
| 2020/0041784 | A1 * | 2/2020 | Wang | G02B 5/005 |
| 2020/0319339 | A1 * | 10/2020 | Chen | G01S 17/42 |
| 2020/0409108 | A1 * | 12/2020 | Ma | G02B 7/022 |
| 2021/0080623 | A1 * | 3/2021 | Cheng | G02B 13/18 |
| 2021/0349282 | A1 * | 11/2021 | Chen | G02B 7/021 |
| 2022/0036033 | A1 * | 2/2022 | Huang | G06V 40/1318 |
| 2022/0066119 | A1 * | 3/2022 | Lai | G02B 3/02 |
| 2022/0349746 | A1 * | 11/2022 | Chiu | G01J 1/029 |
| 2023/0053416 | A1 * | 2/2023 | Choi | G02B 13/0065 |
| 2024/0310486 | A1 * | 9/2024 | Qi | G01S 7/4813 |
| 2025/0291154 | A1 * | 9/2025 | Lin | G02B 9/60 |
| 2026/0101627 | A1 * | 4/2026 | Tomioka | H10K 39/32 |
| 2026/0153652 | A1 * | 6/2026 | Chen | G02B 3/005 |

OTHER PUBLICATIONS

Notice of Rejection of the Chinese application No. 202111196361.4, issued on Jan. 6, 2024. 4 pages.

Second Office Action of the Chinese application No. 202111196361.4, issued on Nov. 1, 2023. 5 pages.

* cited by examiner

OPTICAL EMITTING DEVICE AND OPTICAL SENSOR

CROSS-REFERENCE TO RELATED APPLICATION

The present application claims the benefit of priority to China Patent Application No. CN202111196361.4, filed Oct. 13, 2021, China Patent Application No. CN202210560905.9, filed May 20, 2022, and China Patent Application No. CN 202210808010.2, filed Jul. 8, 2022, the contents of which are all incorporated herein by reference in their entireties.

TECHNICAL FIELD

The present application relates to the technical field of optical sensing, and in particular, to an optical emitting device and an optical sensor.

BACKGROUND

An optical sensor is a device capable of converting optical signals into electrical signals. The optical sensor generally includes an optical emitting device and an optical receiving device. A light source in the optical emitting device emits a detecting light beam to a target object. The optical receiving device receives a light beam reflected from the target object and outputs corresponding reflected signals. After a control portion in the optical sensor processes the reflected signals, distance, azimuth, height, speed, attitude, shape, and other parameters of the target object can be obtained, thereby realizing a detection function.

However, a large-angle stray light in the detecting light beam emitted by the light source to the target object is provided, which affects the detection effect of the optical sensor.

SUMMARY

The present application provides an optical emitting device and an optical sensor, which can reduce an effect of a large-angle stray light on the detection effect of the optical sensor.

In a first aspect, the present application provides an optical emitting device, including:

a body having an emitting cavity extending in a first preset direction, where the emitting cavity has an incident light port and an emergent light port that are arranged in the first preset direction; an inner wall of the emitting cavity has a first inner wall portion and a second inner wall portion, and the first inner wall portion and the second inner wall portion are oppositely arranged;

a light source arranged with the body in the first preset direction, where a light-emitting surface of the light source faces the incident light port;

a first light-blocking structure arranged in the first inner wall portion of the emitting cavity, where a light-transmitting channel is arranged between the first light-blocking structure and the second inner wall portion, the first light-blocking structure comprises a plurality of first light-blocking sheets, and the plurality of first light-blocking sheets are arranged and spaced apart in the first preset direction.

In a second aspect, the present application also provides an optical sensor, including an optical emitting device as described in any of the above examples.

In a third aspect, the present application also provides an optical module, including:

a first structure member having a light-transmitting cavity; and an optical element arranged within the light-transmitting cavity;

the first structure member further has a first end surface, a second end surface, and an inner wall surface; a first through hole and a second through hole in communication with the light-transmitting cavity are arranged on the first end surface and the second end surface, respectively; the inner wall surface is configured to form the light-transmitting cavity; a first extinction structure is arranged on the first end surface and/or the second end surface for blocking a stray light incident to the first end surface and/or the second end surface;

the optical module further comprises a second extinction structure; the inner wall surface comprises a bearing wall surface for bearing against the optical element and a vacant wall surface not bearing against the optical element, the second extinction structure is arranged on at least a portion of the vacant wall surface, the second extinction structure comprises a first light-blocking structure, the first light-blocking structure comprises a plurality of first light-blocking sheets, the plurality of first light-blocking sheets are arranged and spaced apart in the first preset direction and extend in a circumferential direction along at least a portion of the vacant wall surface.

In a fourth aspect, the present application further provides a laser ranging device, including:

a housing having a receiving cavity, where one side of the housing is provided with a third opening;

a light-transmitting sheet capped at the third opening for allowing a light ray to be incident to or emergent out of the receiving cavity;

a laser emitting module located within the receiving cavity, and comprising a laser emitting lens and a laser emitter; and a laser receiving module located within the receiving cavity, and comprising a laser receiving lens and a laser detector;

the laser emitting lens adopts the optical module above, the optical module is located on an emergent light side of the laser emitter and emits laser via the light-transmitting sheet; and/or, the laser receiving lens adopts the optical module above, the optical module is located on an incident light side of the laser detector and receives echo laser via the light-transmitting sheet.

The present application has the following beneficial effects: by arranging the first light-blocking structure on the first inner wall portion, an extinction space is formed between the two adjacent first light-blocking sheets. A light beam incident in the emitting cavity whose angle is within a preset angle range is normally emitted via the light-transmitting channel. A large-angle stray light whose angle is outside a preset range and which emits towards the first inner wall portion is blocked by the first light-blocking structure, and reflected multiple times in the extinction space between the two adjacent first light-blocking sheets, which can effectively dissipate the energy of the large-angle stray light and achieve a function of near extinction, thereby reducing an effect of the large-angle stray light on a detection effect of the optical sensor, and optimizing a point cloud effect of a radar.

BRIEF DESCRIPTION OF DRAWINGS

To explain examples of this application or the technical solutions in the related art more clearly, the following briefly introduces the drawings used in the examples or the related art. Obviously, the drawings in the following description are only some examples of this application. Those skilled in the art can obtain other drawings based on these drawings without inventive labor.

DETAILED DESCRIPTION

In order to make the objectives, technical solutions, and advantages of the present application clearer, the following further describes the present application in detail with reference to the accompanying drawings and examples. It should be understood that the specific examples described herein are only used to explain the present application, but not to limit the present application.

An optical sensor is a device capable of converting optical signals into electrical signals. The optical sensor generally includes an optical emitting device and an optical receiving device. A light source in the optical emitting device emits a detecting light beam to a target object. The optical receiving device receives a reflected light beam reflected from the target object and outputs corresponding reflected signals. After a control portion in the optical sensor processes the reflected signals, distance, azimuth, height, speed, attitude, shape, and other parameters of the target object can be obtained, thereby realizing a detection function.

However, when the light source emits the detecting light beam to the target object, the detecting light beam is reflected multiple times on the emitting cavity wall, thereby generating a large-angle stray light, which affects a detection effect of an optical sensing device.

An example of the present application provides an optical emitting device and an optical sensor, to solve the problem that a large-angle stray light is provided in the detecting light beam emitted by a light source to a target object, which affects the detection effect of the optical sensor.

Figure 1:
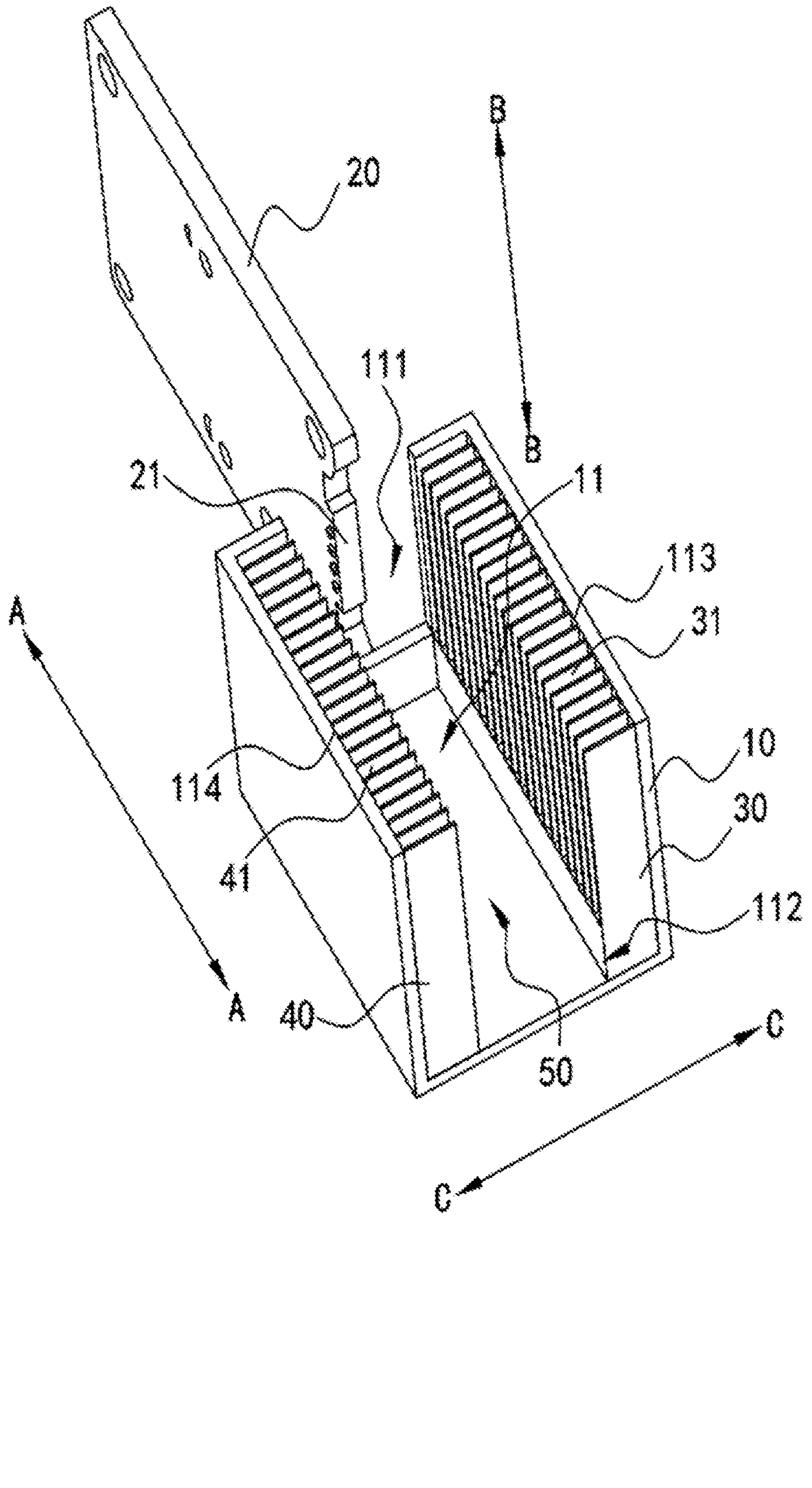
FIG. 1 is a perspective structural diagram of an optical emitting device according to an example of the present application.
Figure 2:
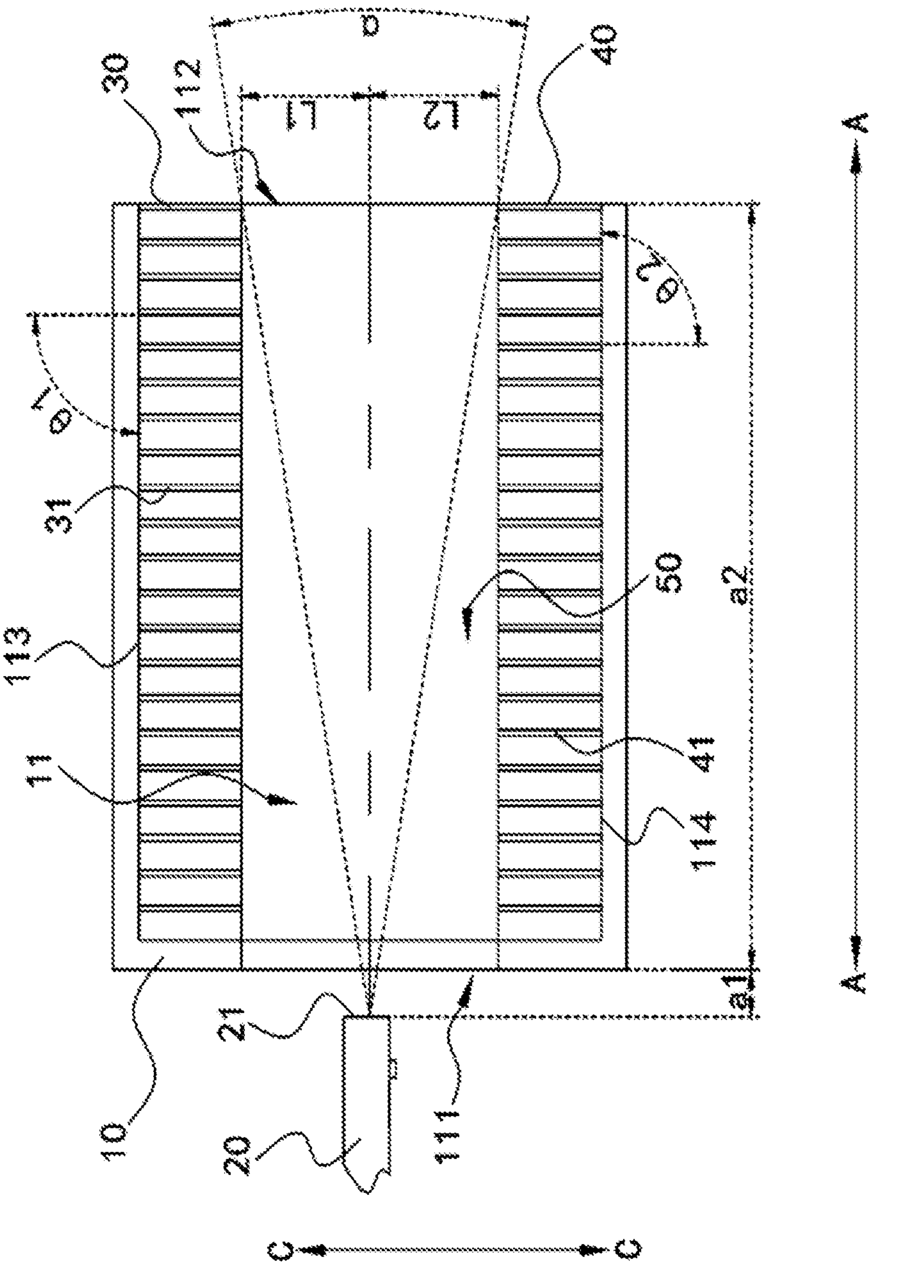
FIG. 2 is a planar structural diagram of an optical emitting device according to an example of the present application.

In a first aspect, the present application provides an optical emitting device, including a body 10 and a light source 20, as shown in FIGS. 1 and 2.

The body 10 has an emitting cavity 11 extending in a first preset direction AA. The emitting cavity 11 has an incident light port 111 and an emergent light port 112 that are arranged in the first preset direction. An inner wall of the emitting cavity 11 has a first inner wall portion 113 and a second inner wall portion 114. The first inner wall portion 113 and the second inner wall portion 114 are oppositely arranged. It should be noted that a preparation material of the body 10 can be a non-light-transmitting material, such as non-light-transmitting plastic, metal, wood, or resin, which is not specifically limited to the embodiments of the present application. The body 10 and the transmitting cavity 11 can be cylindrical, square cylindrical, or other shapes, which are not specifically limited to the embodiments of the present application. Taking the square cylindrical transmitting cavity 11 as an example, the transmitting cavity 11 has a plurality of inner wall surfaces. The first inner wall portion 113 is one inner wall surface of the transmitting cavity 11. The second inner wall portion 114 is another inner wall surface of the transmitting cavity 11.

The light source 20 and the body 10 are arranged in the first preset direction AA, and a light-emitting surface 21 of the light source 20 faces the incident light port 111. It should be noted that the light source 20 is configured to emit a light beam into the emitting cavity 11 of the body 10. The light source 20 can be a face light source 20, a spot light source 20, or a ray light source 20. The light source 20 can be a laser light source 20. The light source 20 can also be other kinds of light sources 20, such as a high intensity LED light source 20.

It can be understood that the optical sensor is a laser radar applied on a vehicle as an example. The light source 20 in the optical emitting device emits the detecting light beam to the target object according to emitted signals. The optical receiving device in the optical sensor receives a reflected light ray from the target object and outputs corresponding reflected signals. After a control portion in the optical sensor processes the reflected signals, a point cloud map of radar is formed. After data of the point cloud map of radar are processed, parameters such as distance, azimuth, height, speed, attitude, and shape of the target object can be obtained, thereby realizing a detection function of a radar. According to actual needs, the optical sensor can also realize the functions of diameter detection, surface roughness detection, strain detection, displacement detection, vibration detection, speed detection, distance detection, and acceleration detection of a part as well as shape detection of an object.

The light beam emitted by the light source 20 has an extremely large number of angles of light. Therefore, a large-angle stray light is provided in the light beam emitted by the light source 20. This affects a point cloud effect of a LIDAR, thereby affecting the detection effect of the LIDAR. In the present application, the body 10 can adjust the angle of the light beam emitted by the light source 20. After the light beam emitted by the light source 20 enters the emitting cavity 11 via an incident light port 111, the light beam emitted via an emergent light port 112 of the emitting cavity 11 is detecting the light beam. By designing a size of the emergent light port 112, an angle of most of the light rays emergent out of the emitting cavity 11 can be in a preset angle range, thereby eliminating a portion of the large-angle stray light and obtaining the detecting light beam in the preset angle range.

However, in the related art, an inner wall of the emitting cavity 11 is generally a smooth plane. It is known to those skilled in the art that when the light beam emitted by the light source 20 is incident in the emitting cavity 11, the inner wall of the emitting cavity 11 reflects light, resulting in the angle of the light partially emergent out of the emergent light port 112 not being within the preset angle range, thus causing the body 10 to be unable to effectively eliminate an effect of the stray light on the optical sensor.

Specifically, as shown in FIGS. 1 and 2, the optical emitting device further includes a first light-blocking structure 30. The first light-blocking structure 30 is arranged in a first inner wall portion 113 of the emitting cavity 11. A light-transmitting channel 50 is arranged between the first light-blocking structure 30 and the second inner wall portion 114. The first light-blocking structure 30 includes a plurality of first light-blocking sheets 31. The plurality of first light-blocking sheets 31 are arranged and spaced apart in the first preset direction AA.

It should be noted that in the present application, by arranging the first light-blocking structure 30 on the first inner wall portion 113, an extinction space is formed between the two adjacent first light-blocking sheets 31. The light beam incident in the emitting cavity 11 whose angle is within a preset angle range is normally emitted via the light-transmitting channel 50. A large-angle stray light whose angel is outside a preset range and which emits towards the first inner wall portion 113 is blocked by the first light-blocking structure 30, and reflected multiple times in the extinction space between the two adjacent first light-blocking sheets 31, which can effectively dissipate the energy of the large-angle stray light and achieve a function of near extinction, thereby reducing an effect of the large-angle stray light on a detection effect of the optical sensor, and optimizing a point cloud effect of a radar.

In some embodiments, as shown in FIGS. 1 and 2, the optical emitting device can further include a second light-blocking structure 40. The second light-blocking structure 40 is arranged in the second inner wall portion 114 of the emitting cavity 11. The light-transmitting channel 50 is located between the second light-blocking structure 40 and the first light-blocking structure 30.

The second light-blocking structure 40 includes a plurality of second light-blocking sheets 41 arranged and spaced apart in the first preset direction AA.

It can be understood that an extinction space is also provided between the two adjacent second light-blocking sheets 41. The large-angle stray light whose angle is outside the preset range and which emits towards the second inner wall portion 114 is blocked by the second light-blocking structure 40, and reflected multiple times in the extinction space between the two adjacent second light-blocking sheets 41. The first light-blocking structure 30 can effectively dissipate the energy of the large-angle stray light on one side of the light source 20. The second light-blocking structure 40 can effectively dissipate the energy of the large-angle stray light on the other side of the light source 20, thereby further mitigating the effect of the large-angle stray light on the detection effect of the optical sensor.

Generally, the greater the number of the first light-blocking sheets 31, the smaller the distance between the two adjacent first light-blocking sheets 31, and the better the extinction effect of the first light-blocking structure 30. Similarly, the larger the number of the second light-blocking sheets 41, the smaller the distance between the two adjacent second light-blocking sheets 41, and the better the extinction effect of the second light ray structure 40. Specific values of the spacing between the two adjacent first light-blocking sheets 31 and the spacing between the two adjacent first light-blocking sheets 31 can be selected according to actual needs, and are not specifically limited in the present application It is also necessarily noted that preparation materials of the first light-blocking sheet 31 and the second light-blocking sheet 41 can be non-light-transmitting materials, such as non-light-transmitting plastic, metal, wood, or resin, which is not specifically limited by the example of the present application. A shape of the first light-blocking sheet 31 can be matched to a shape of a cross-section of the first inner wall portion 113. A shape of the second light ray 41 can be matched to a shape of a cross-section of the second inner wall portion 114.

Referring to FIGS. 1 and 2, in some examples of the present application, all of the first light-blocking sheets 31 are arranged in parallel with each other, and all of the second light-blocking sheets 41 are arranged in parallel with each other, so as to reduce design differences between the first light-blocking sheet 31 and the second light-blocking sheet 41, thereby making it possible to reduce the difficulty of preparation processes of the first light-blocking structure 30 and the second light-blocking structure 40, and facilitating preparation and shaping of the first light-blocking structure 30 and the second light-blocking structure 40.

Further, the first light-blocking sheet 31 can be arranged in parallel with the second light-blocking sheet 41 to reduce the design difference between the first light-blocking sheet 31 and the second light-blocking sheet 41. Therefore, the difficulty of preparation processes of the first light-blocking structure 30 and the second light-blocking structure 40 can be further reduced, so as to facilitate the preparation and shaping of the first light-blocking structure 30 and the second light-blocking structure 40. Additionally, the difference between an extinction effect of the first light-blocking structure 30 and an extinction effect of the second light-blocking structure 40 is small, so the uniformity of a light beam emergent out of the emergent light port 112 of the emitting cavity 11 can be improved.

It should be noted that the first light-blocking sheet 31 can also be arranged with the second light-blocking sheet 41 in one-to-one correspondence to further eliminate the difference between the extinction effect of the first light-blocking structure 30 and the extinction effect of the second light-blocking structure 40, and improve the uniformity of the light beam emergent out of the emergent light port 112 of the emitting cavity 11.

Referring to FIGS. 1 and 2, in an example of the present application, the first light-blocking structure 30 and the second light-blocking structure 40 can be symmetrically distributed relative to the light-emitting surface 21 of the light source 20.

It can be understood that the first light-blocking structure 30 shields and weakens the large-angle stray light on one side of the light source 20. The second light-blocking structure 40 can shield and weaken the large-angle stray light on the other side of the light source 20. The first light-blocking structure 30 and the second light-blocking structure 40 can also be symmetrically distributed relative to the light-emitting surface 21 of the light source 20, so that the light beam emergent out of the emergent light port 112 of the emitting cavity 11 are generally symmetrically distributed relative to the light-emitting surface 21, hereby facilitating adjustment of an angle of the light beam emergent out of the emergent light port 112 of the emitting cavity 11. Therefore, an angle of a vast majority of light of the light beam emergent out of the emergent light port 112 of the emitting cavity 11 can be in a preset angle range, and a degree of attenuation of a large-angle stray light on both sides of the light source 20 is roughly comparable. Therefore, the uniformity of the light beam emergent out of the emergent light port 112 of the emitting cavity 11 can be further enhanced.

It should also be noted that the first light-blocking structure 30 can further include a first base. The second light-blocking structure 40 can further include a second base. The first light-blocking sheet 31 can be fixed on the first base to form the first light-blocking structure 30. The second light-blocking sheet 41 is fixed on the second base to form the second light-blocking structure 40. The first base and the second base are fixed on the first inner wall portion 113 by screw connection, riveting, hinge, welding, or other ways, so that the first light-blocking structure 30 and the second light-blocking structure 40 are conveniently shaped, and the first light-blocking structure 30 and the second light-blocking structure 40 are also conveniently installed and fixed within the emitting cavity 11.

Referring to FIGS. 1 and 2, in some examples of the present application, the light-emitting surface 21 of the light source 20 extends in a second preset direction BB. The first inner wall portion 113 and the second inner wall portion 114 are arranged in a third preset direction CC. The first preset direction AA, the second preset direction BB, and the third preset direction CC are perpendicular to each other.

It can be understood that by designing a position of the light source 20 and a direction of extension of the light-emitting surface 21 of the light source 20, on the premise of ensuring that the angle of a vast majority of the light beam emergent out of the emergent light port 112 of the emitting cavity 11 is within the preset angle range to reduce the effect of the large-angle stray light on the detection effect of the optical sensor, the amount of light emergent out of the light source 20 is increased so that detection accuracy of the optical sensor can be improved.

Further, the first light-blocking structure 30 and the second light-blocking structure 40 can both extend from the incident light port 111 to the emergent light port 112. It can be understood that by increasing the extension length of the first light-blocking structure 30 and the second light-blocking structure 40, the extinction effect of the first light-blocking structure 30 and the second light-blocking structure 40 can be further enhanced. The first light-blocking structure 30 and the second light-blocking structure 40 have a light-blocking function. When the first light-blocking sheet 31 and the second light-blocking sheet 41 are also arranged at the emergent light port 112, the angle range of the light beam emergent out of the emergent light port 112 of the emitting cavity 11 can also be controlled by designing lengths of the first light-blocking sheet 31 and the second light-blocking sheet 41 in the third preset direction CC.

In some embodiments, as shown in FIG. 2, a spacing a1 is provided between the light source 20 and the incident light port 111 in the first preset direction AA. A length a2 of the emitting cavity 11 in the first preset direction AA is provided. A spacing L1 is provided between a center of the light-emitting surface 21 and the first inner wall portion 113 in the third preset direction CC. A spacing L2 is provided between the center of the light-emitting surface 21 and the second inner wall portion 114 in the third preset direction CC. An included angle θ1 is formed between the first light-blocking sheet 31 and the first inner wall portion 113. An included angle θ2 is formed between the second light-blocking sheet 41 and the second inner wall portion 114, where:

$$\left(\frac{\pi}{2}-\arctan\left(\frac{L1}{a1+a2}\right)\right)\leq\theta1\leq 90^\circ,\ \left(\frac{\pi}{2}-\arctan\left(\frac{L2}{a1+a2}\right)\right)\leq\theta2\leq 90^\circ.$$

It can be understood that when the first light-blocking sheet 31 is perpendicular to the first inner wall portion 113, θ1 is a right angle. However, when the first light-blocking sheet 31 is not perpendicular to the first inner wall portion 113, θ1 is an acute angle. When the second light-blocking sheet 41 is perpendicular to the second inner wall portion 114, θ2 is a right angle. However, when the second light-blocking sheet 41 is not perpendicular to the second inner wall portion 114, θ2 is an acute angle.

It can also be understood that an angle α of the light beam emergent out of the emergent light port 112 of the emitting cavity 11 depends on factors such as the spacing between the light source 20 and the incident light port 111 in the first preset direction AA, a length of the emitting cavity 11 in the first preset direction AA, the spacing between the center of the light emitting surface 21 and the first inner wall portion 113 in the third preset direction CC, and the spacing between the center of the light emitting surface 21 and the second inner wall portion 114 in the third preset direction CC. However, the angle α of the light beam emergent out of the emergent light port 112 of the emitting cavity 11 is:

$$\arctan\left(\frac{L1}{a1+a2}\right)+\arctan\left(\frac{L2}{a1+a2}\right).$$

It should also be noted that by designing θ1 and θ2, the angle of a vast majority of the light ray emergent out of the emergent light port 112 is in the preset angle range after the light beam of the light source 20 emitting into the emitting cavity 11 are adjusted by the first light-blocking structure 30 and the second light-blocking structure 40, so that the effect of the large-angle stray light on the detection effect of the optical sensor can be reduced.

Referring to FIG. 2, in an example of the present application, the lengths of the first light-blocking sheets 31 in the third preset direction CC can be the same. The lengths of the second light-blocking sheets 41 in the third preset direction CC can be the same. Additionally, the first light-blocking structure 30 is square in a whole, and the second light-blocking structure 40 is square in a whole.

Figure 3:
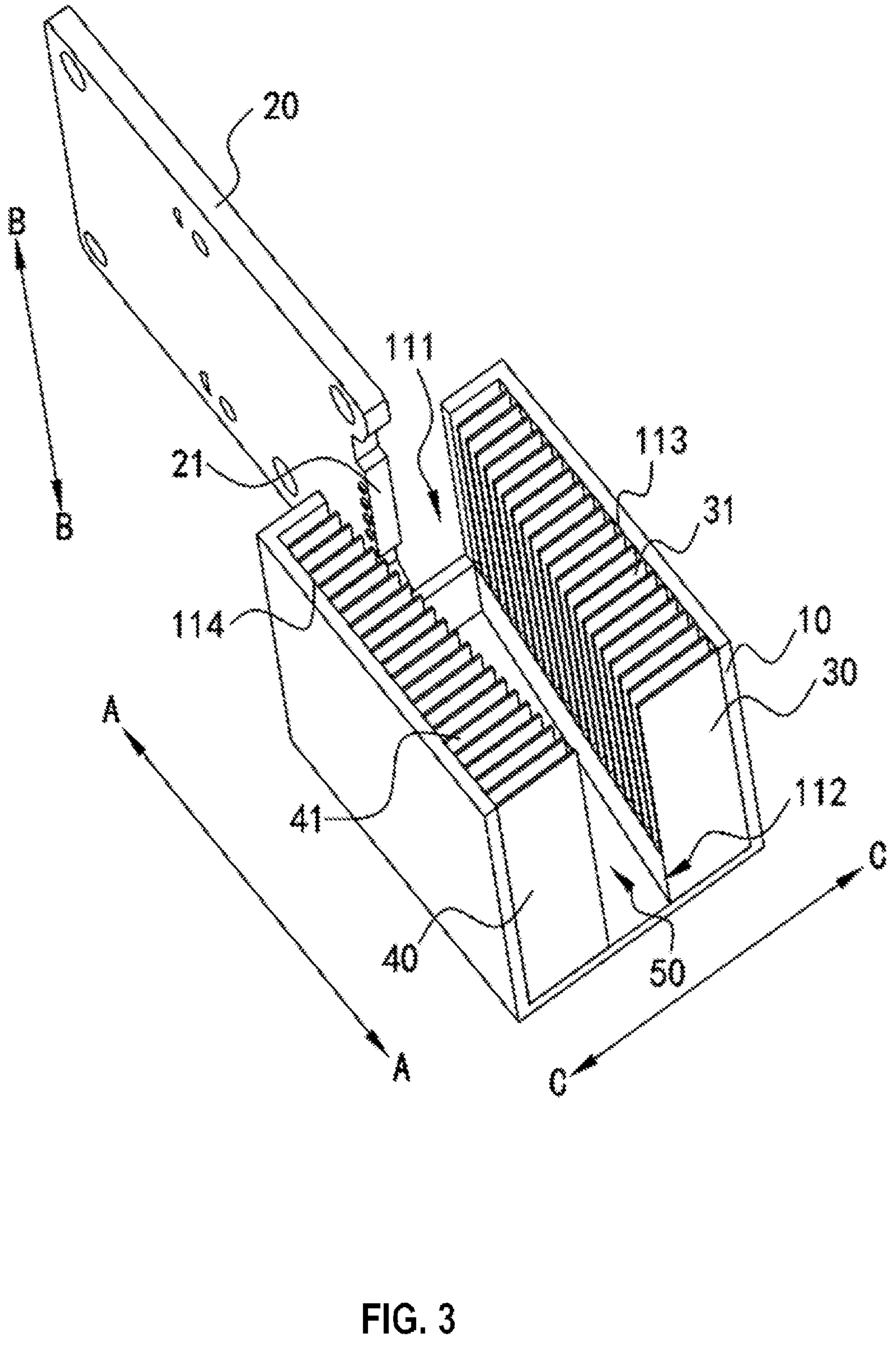
FIG. 3 is a perspective structural diagram of an optical emitting device according to another example of the present application.

The first light-blocking structure 30 and the second light-blocking structure 40 can also be designed as other shapes, as shown in FIG. 3. In another example of the present application, in the first light-blocking structure 30, the length m1 of the first light-blocking structure 31 in the third preset direction CC is provided. A spacing n1 between the first light-blocking structure 31 and the incident light port 111 in the first preset direction AA is provided. m1 is directly proportional to n1. Additionally, the first light-blocking structure 30 is trapezoidal as a whole.

In the second light-blocking structure 40, a length m2 of the second light-blocking sheet 41 in the third preset direction CC is provided. A spacing n2 between the second light-blocking sheet 41 and the inlet port 111 in the first preset direction AA is provided. m2 is directly proportional to n2. Additionally, the shape of the second light-blocking structure 40 is trapezoidal as a whole.

It can be understood that the first light-blocking structure 30 is a trapezoidal structure that is gradually widened from the incident light port 111 to the emergent light port 112, and the second light-blocking structure 40 is also a trapezoidal structure that is gradually widened from the incident light port 111 to the emergent light port 112, so that the light-transmitting channel 50 located between the second light-blocking structure 40 and the first light-blocking structure 30 is gradually narrowed from the incident light port 111 to the emergent light port 112. Therefore, the width of the emergent light port 112 can be reduced under the premise of ensuring the extinction effects of the first light-blocking structure 30 and the second light-blocking structure 40, thereby reducing the angle of the light beam emergent out of the emergent light port 112 of the emitting cavity 11.

Referring to FIG. 3, in an example of the present application, a length of the first light-blocking sheet 31 in the second preset direction BB is greater than a length of the light source 20 in the second preset direction BB. A length of the second light-blocking 41 in the second preset direction BB is greater than the length of the light source 20 in the second preset direction BB, so that a vast majority of the large-angle stray light of the light source 20 emitting into the emitting cavity 11 can be weakened by the first light-blocking structure 30 and the second light-blocking structure 40.

Figure 4:
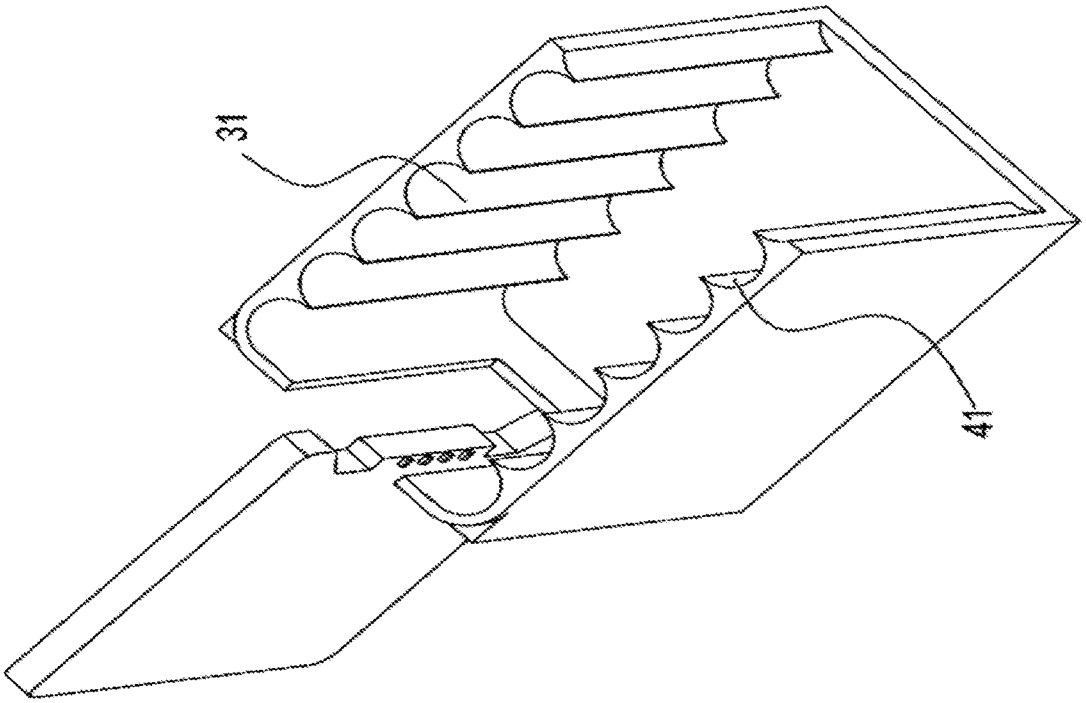
FIG. 4 is a perspective structural diagram of an optical emitting device according to another example of the present application.

It should be noted that the two adjacent first light-blocking sheets 31 and the two adjacent second light-blocking sheets 41 are connected via a connecting portion. In FIGS. 1 to 3, only a cross-section of the connecting portion is shown as a rectangle. According to actual needs, as shown in FIG. 4, the cross-section of the connecting portion can also be arc-shaped.

Based on the optical emitting device described above, an example of the present application further provides an optical sensor, including an optical emitting device described in any of the above examples. The optical sensor can also include all or part of an optical receiving device, an optical adjusting device (which may, for example, be an optical lens), a rotary drive device, a housing, or an optical scanning device.

The optical sensor can be mounted on a body of a vehicle, and the vehicle can be any specification and model of the vehicle, which is not specifically limited to the embodiments of the present application.

The optical sensor can be applied in an environment-sensing system of the vehicle. The optical sensor can also be applied in an environment-sensing system of an unmanned aerial vehicle, a robot, or other apparatuses to realize 3d (3 dimensions) sensing, environmental image sensing, and other functions.

The optical sensor can also be applied to an active suspension system of the vehicle. For example, in the active suspension system, the optical sensor can send corresponding signals to an electric control unit of the vehicle according to the height of a vehicle, vehicle speed, steering angle, velocity, braking, etc. The electric control unit of the vehicle controls an actuating mechanism of a suspension, so that a stiffness of the suspension, a damping force of a shock absorber, the height of the vehicle body, and other parameters are changed. Therefore, the vehicle has good ride comfort and operational stability. The optical sensors can also be applied in a light control system, a speed measuring system, and an operating control system of the vehicle.

Further, the optical module is a structure that can allow incidence of light in a preset angle range and emit incident light in accordance with another preset angle range, and can be applied to an optical system such as an optical emitting device, an optical receiving device, or an optical transceiving device. When the optical module is applied to a light emitting portion in the optical emitting device or the optical transceiving device, the optical module is arranged on an emergent light side of a light source in the optical emitting device or the optical transceiving device for receiving a light ray emitted by the light source in a preset angle range and emitting a received light ray in accordance with a preset emitting angle range. When the optical module is applied to a light receiving portion of the optical receiving device or the optical transceiving device, the optical module can be arranged on an incident light side of a light detector in the optical emitting device or the optical transceiving device for receiving a light ray within a preset receiving angle range and emitting a received light ray to a light detector in accordance with the preset angle range.

The optical transceiving device can be a laser ranging device. The laser ranging device typically includes the optical emitting device and the optical receiving device. The optical emitting device is a laser emitting module. The optical receiving device is a laser receiving module. The laser emitting module is configured to emit an emergent laser. The emergent laser is emitted as a detecting light beam to a target object in the detecting region. The laser receiving module is configured to receive an echo laser reflected from the target object and output electrical signals corresponding to the echo laser. The electrical signals corresponding to an echo light beam are appropriately processed by a signal processing device to form a point cloud map. By processing the point cloud map, distance, azimuth, height, speed, attitude, shape, and other parameters of the target object can be obtained, thus realizing a laser detection function, which can be applied to navigation avoidance, obstacle recognition, ranging, speed measurement, autonomous driving, and other scenarios of an automobile, a robot, a logistics vehicle, a patrol vehicle, and other products.

When the optical module is applied to the optical system such as the optical emitting device, the optical receiving device, or the optical transceiving device, the optical systems described above usually also include a structural member for protecting the optical module, such as a housing. An inner part of the housing also includes other internal structures. When the optical module emits or receives a light ray, the light ray may emit towards an end surface of the optical module after the light ray is reflected by the structure on the housing (such as a light-transmitting plate). The light ray incident to the end surface of the optical module is reflected to form a stray light, which affects the normal working performance of the optical module. Additionally, the light ray transmitted within the optical module can include a large-angle stray light, which also affects the normal working performance of the optical module.

Further, the example of the present application provides an optical module and a laser ranging device, to solve the problem that a light ray received and/or emitted by the optical module contains stray lights, which affects the normal working performance of the optical module, and thus affects a detection performance of the laser ranging device.

EXAMPLE 1

Figure 5:
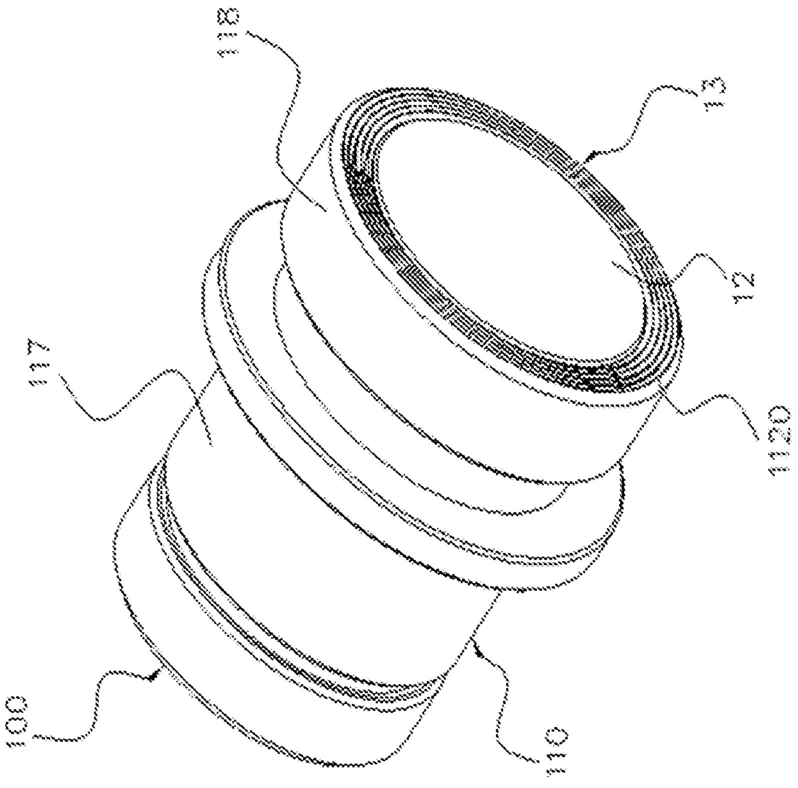
FIG. 5 is a perspective structural diagram of an optical module according to an embodiment of the present application.
Figure 6:
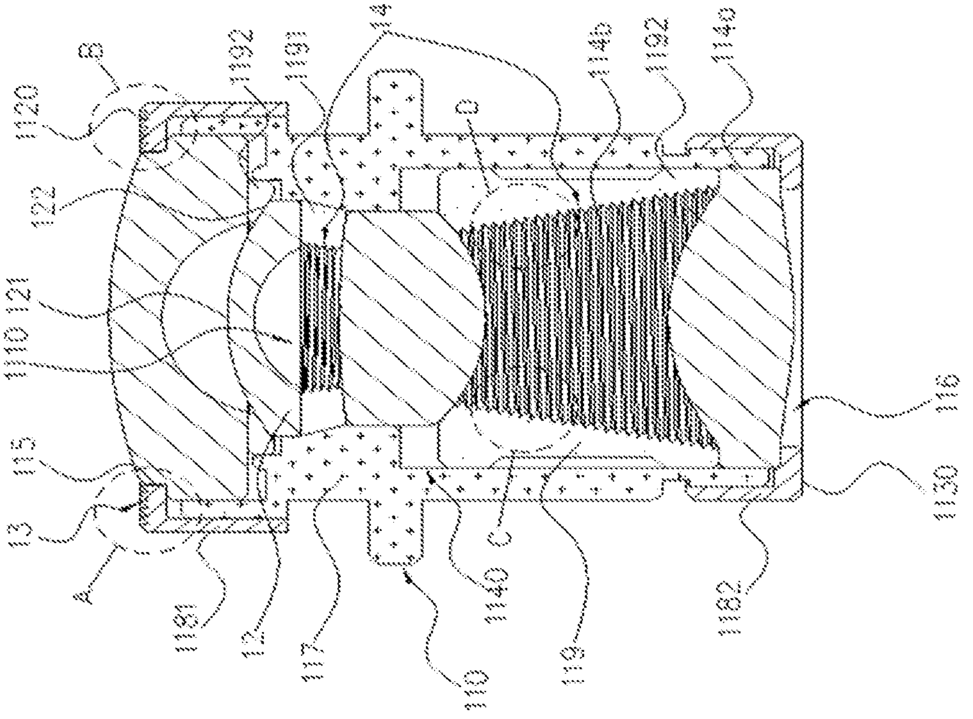
FIG. 6 is a structural sectional diagram of an optical module according to an embodiment of the present application.

In a first aspect, Example 1 of the present application provides an optical module 100. As shown in FIGS. 5 and 6, the optical module 100 includes a first structure member 110 and an optical element 12. The first structure 110 has a light-transmitting cavity 1110, a first end surface 1120, a second end surface 1130, and an inner wall surface 1140. The first end surface 1120 and the second end surface 1130 are located at both ends of the first structure member 110, respectively, and are provided with a first through hole 115 and a second through hole 116. The first through hole 115 and the second through hole 116 are communicated with a light-transmitting cavity 1110 for allowing a light ray to be incident to or emergent out of the light-transmitting cavity 1110. The inner wall surface 1140 is configured to enclose the light-transmitting cavity 1110. An optical element 12 is arranged in the light-transmitting cavity 1110, and is made of a light-transmitting material for allowing transmission of the light ray, and adjusting the light ray, for example, changing the propagation direction of the light ray, changing a light spot form and a light spot size of the light beam consisting of a number of light rays. The first structure member 110 is configured to provide an assembly space for the optical element 12 to protect the optical element 12, and is also configured to provide a light-transmitting channel for allowing light to be incident to or emergent out.

The light-transmitting material includes a light-transmitting glass, a light-transmitting plastic, or a light-transmitting resin. The optical element 12 can be at least one of a lens, a light filtering sheet, a uniform light sheet, or other optical elements. The present application does not limit the material, type, size, or the like of the optical element 12, which can be designed according to actual needs.

The optical module 100 can include one or more optical elements 12. When the optical module 100 includes the plurality of optical elements 12, types of the plurality of optical elements 12 can be identical, completely different, or partially identical. For example, when the optical module 10 includes the plurality of optical elements 12, the plurality of optical elements 12 can all be the lenses, can also include the lens and the light filtering sheet, and can also include the lens, the light filtering sheet, and the uniform light sheet. When the optical element 12 includes the lens, the lens can include at least one of a convex lens or a concave lens. The lens can include a spherical mirror, and can also include an aspherical mirror. When the optical element 12 includes the light filtering sheet, the light filtering sheet in the optical module 100 can be adjusted so that the wavelength of the center of the light filtering sheet is matched with an actually desired light wavelength. When the optical element 12 includes the uniform light sheet, the uniform light sheet in the optical module 100 can be adjusted so that a spot state presented by a light beam output through the uniform light sheet is matched with an actually desired spot form. The present application does not limit the optical elements 12 in terms of number, variety, specific optical parameters, and so on, which can be designed according to actual needs.

Further, as shown in FIGS. 5 and 6, the optical module 100 further includes a first extinction structure 13. The first extinction structure 13 is arranged on the first end surface 1120 for blocking a light ray that is at least partially incident on the first end surface 1120, and/or the first extinction structure 13 is arranged on the second end surface 1130 for blocking a light ray that is at least partially incident on the second end surface 1130. For the optical module 100 provided in the present application, the first extinction structure 13 is arranged on the end surface 1120 and/or the second end surface 1130. When a stray light, whose angle is outside a preset angle range of the light-transmitting cavity 111, is incident to the first end surface 1120 and/or the second end surface 1130, after the stray light is reflected by the first extinction structure 13 on the corresponding end surface, and after the stray light is transmitted in a direction away from a normal optical path of the optical module 10 and/or is reflected multiple times by the first extinction structure 13 on the corresponding end surface, the energy of the stray light is effectively dissipated to an approximate extinction, which can at least partially block a light ray incident to the first end surface 1120, and reduce the effect of the stray light on the normal operation of the optical emitting device, the optical receiving device, or the optical transceiving device. The normal optical path refers to an angle range covered by a light ray that is incident into the light-transmitting cavity 1110 through a preset incident angle range, guided by the optical element 12 in the light-transmitting cavity 1110, and emergent out of the light-transmitting cavity 111 with the preset emergent angle range.

It can be understood that the first extinction structure 13 can also be referred to as a first light-blocking structure, which reduces the effect of the stray light on the normal working performance of the optical emitting device, the optical receiving device, or the optical transceiving device by reflecting the light ray multiple times within the structure to consume the energy of the stray light.

Referring to FIGS. 5 to 8, in an exemplary embodiment, the first end surface 1120 is provided with the first extinction structure 13. The first extinction structure 13 includes a first groove 131. The first groove 131 is arranged on the first end surface 1120, and extends in a circumferential direction of a first through hole 115. The first groove 131 can include a first side 131*a* and a second side 131*b*. The first side 131*a* is a side wall of the first groove 131 close to the first through hole 115. The second side 131*b* is a side wall of the first groove 131 that is away from the first through hole 115. After the light ray emitting on the first side 131*a* is reflected by the first side 131*a*, the reflected light ray is emergent out of the first groove 131 in a direction away from the first through hole 115, and then is transmitted in a direction away from the normal optical path of the optical module 100. The reflected light ray is not re-incident into the light-transmitting cavity 1110 of the optical module 100. Alternatively, the reflected light is reflected multiple times within the first groove 131, so that the energy is effectively attenuated to reach an approximate extinction. Therefore, the effect of the stray light on the normal working performance of the optical emitting device and/or the optical receiving device can be reduced. The light ray incident on the second side surface 131*b* is reflected multiple times within the first groove 131, so that the energy is effectively attenuated to an approximate extinction, which can prevent the reflected light ray at least partially incident on the first end surface 1120 from overlapping with the normal optical path of the optical module 100. This can reduce the effect of the stray light on the normal operating performance of the optical emitting device and/or the optical receiving device. The light ray incident on the second side surface 131*b* is reflected multiple times within the first groove 131, so that the energy of the stray light is effectively attenuated to an appropriate extinction effect. Therefore, the effect of the stray light on the normal working performance of the optical emitting device, the optical receiving device, or the optical transceiving device can be reduced.

It can be understood that when the light ray is reflected multiple times within the first groove 131, the more times the light ray is reflected, the more energy decays, and the better the extinction effect is.

Figure 9:
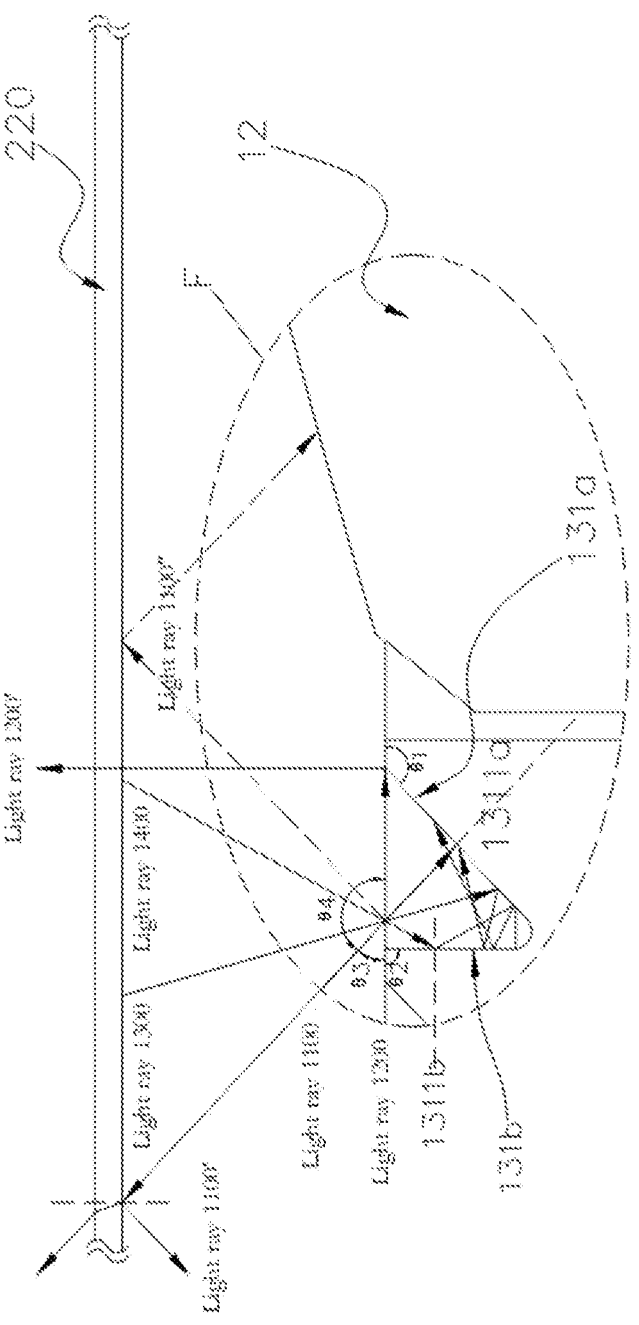
FIG. 9 is a schematic diagram of an optical path in which a light ray is emitted into a first groove according to an embodiment of the present application.
Figure 10:
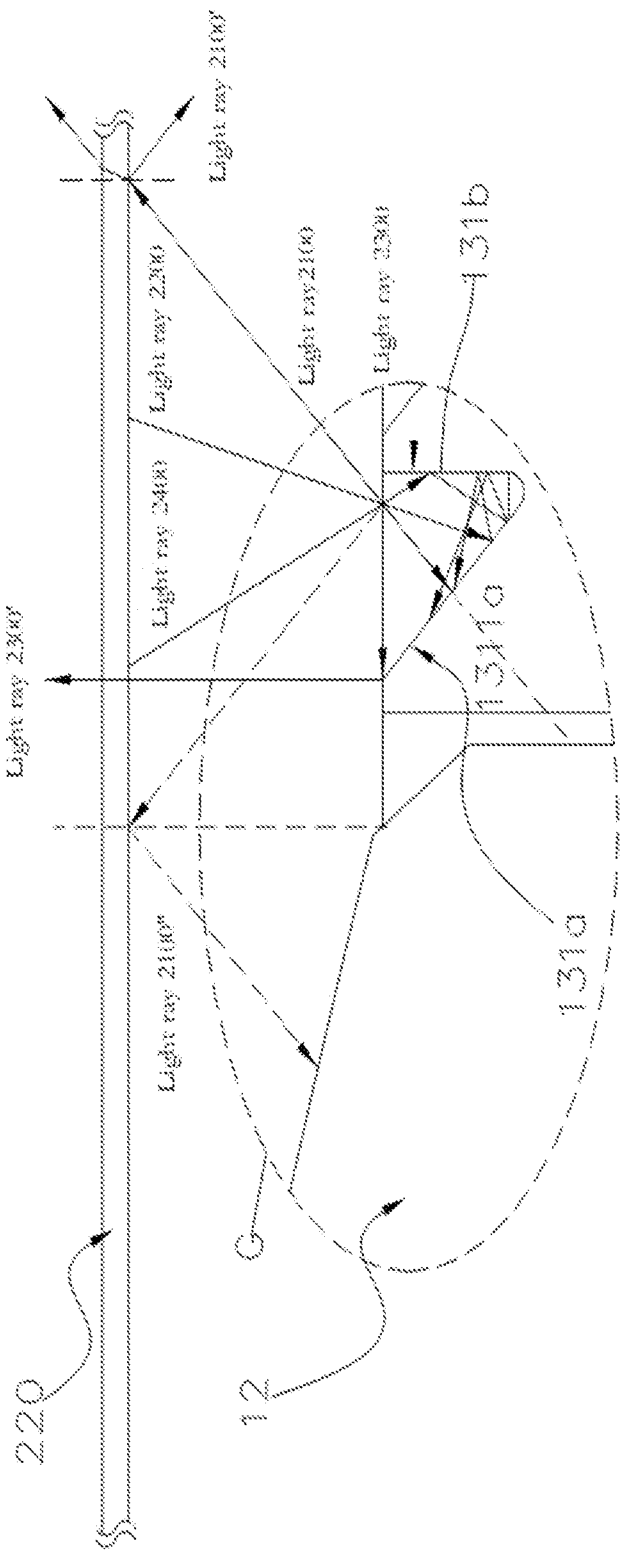
FIG. 10 is a schematic diagram of another optical path in which a light ray is emitted into a first groove according to an embodiment of the present application.

As shown in FIGS. 9 and 10, in an exemplary embodiment, an included angle θ1 between the first side 131*a* and the first end surface 1120 is equal to 145 degrees. An included angle θ2 between the second side 131*b* and the first end surface 1120 is equal to 90 degrees. The first side 131*a* has a first normal direction 1311*a*. The second side has a second normal direction 1311*b*. The first normal direction 1311*a* is perpendicular to the first side 131*a*. The second normal direction 1311*b* is perpendicular to the second side 1311*b*. As shown in FIGS. 5 and 6, for the first groove 131 located on the left side of the first through hole 115, light rays 1100 and 2100 that are incident on the first side 131*a* in the first normal direction 1311*a* are reflected out of the first groove 131 in an original reverse direction, namely, respective reflected light rays 1100' and 2100' are both emergent in the direction away from the first through hole 115. According to the reflection law of light, after the reflected rays 1100' and 2100' are reflected back by a device such as a light-transmitting protection plate 220 toward the direction away from the first through hole 115, the rays are emergent by a very high probability toward a direction that is continuously away from the first through hole 115, namely, a direction away from the normal optical path of the optical module 100. Additionally, from FIGS. 9 and 10, it is assumed that the first end surface 1120 is not provided thereon with the first groove 131. The light rays 1100 and 2100 that are originally incident on the first side 131*a* in the direction of a first normal 1311*a* are directly incident on a plane of the first end surface 1120. After being reflected by the plane on the first end surface 1120, the light rays are emergent toward a direction close to the first through hole 115. After being reflected by the light-transmitting protection plate 220 and other devices in front, the reflected rays 1100" and 2100" can pass through the first through hole. 115 into the light-transmitting cavity 1110, namely, overlapping with the normal optical path of the optical module 100. That is, the first end surface 1120, which is not provided with the first groove 131 cannot effectively block the stray light.

As shown in FIGS. 9 and 10, in the present embodiment, since the included angle θ1 between the first side 131*a* and the first end surface 1120 is equal to 145 degrees, the light rays 11 and 22, which are nearly parallel to the first end surface 1120 and incident on the first side 131*a*, are reflected by the first side 131*a* and exit the first groove 131 as reflected light rays 1200' and 2200' in a direction close to perpendicular to the first end surface 1120 according to the reflection law of light. After being incident towards the light-transmitting protection plate 220 and other devices, the reflected rays 1200' and 2200' may be directly emergent out of the light-transmitting protection plate 220 and other devices, or return back in the original path and emit towards the first groove 131. That is, the reflected rays 1200' and 2200' deviate from the normal light path of the optical module 100.

Thus, it can be understood that after a light ray, which is located on one side of the first normal direction 1311*a* away from the first through hole 115, and is incident on the first side surface 131*a* at any angle in an angle range θ3 between a direction parallel to the first end surface 1120 and the first normal direction 1311*a*, is reflected by the first side surface 131*a*, the light ray can be emergent out of the first groove 131 in the direction away from the first through hole 115. This portion of the light ray is emergent out with a vast probability in a direction that is continuously away from the first through hole 115, thereby effectively reducing the probability that the reflected light ray is incident into the transmitting cavity 1110 via a light-transmitting region defined by the first through hole 115. This further effectively prevents the light ray incident to the first end surface 1120 from overlapping with the normal optical path of the optical module 100 after the light ray is reflected, thereby reducing the effect of the stray light on the normal operation performance of the optical emitting device and/or the optical receiving device.

As shown in FIGS. 9 and 10, an angle range θ4, which is located on the side of the first normal direction 1311*a* close to the first through hole 115 and is the first normal direction 1311*a* and a direction parallel to the first end surface 1120, is provided. After being reflected by the first side surface 131*a*, the light rays 1300, 1400, 2300, and 2400 which are at any angle in the angle range θ4 can be incident to the second side 131*b* in the direction away from the first through hole 115, and reflected by the second side 131*b*. This portion of the light rays can be reflected multiple times within the first groove 131 to effectively attenuate the energy to an approximate extinction effect. This further effectively prevents the light ray incident to the first end surface 1120 from overlapping with the normal optical path of the optical module 100 after the light ray is reflected, thereby reducing the effect of the stray light on the normal work performance of the optical emitting device and/or the optical receiving device.

In some embodiments, 90 degrees<θ1<145 degrees, θ2=90 degrees. After a light ray, which is located on the side of the first normal direction 1311*a* away from the first through hole 115 and is incident to the first side 131*a* at any angle within an angle range θ3 between the direction parallel to the first end surface 1120 and the first normal direction 1311*a*, is reflected by the first side 131*a*, the light ray can be emergent out of the first groove 131 in the direction away from the first through hole 115. However, after the light rays 1300, 1400, 2300, and 2400, which are located on the side of the first normal direction 1311*a* close to the first through hole 115 and are incident to the first side 131*a* at any angle within in the angle range θ4 between the first normal direction 1311*a* and the direction parallel to the first end surface 1120, are reflected by the first side 131*a*, the light rays 1300, 1400, 2300, and 2400 can be incident to the second side 131*b* in the direction away from the first through hole 115 and can be reflected multiple times in the first groove 131. The first groove 131 provided in this example prevents the light ray incident to the first side 131*a* from overlapping with the normal optical path of the optical module 100 after being reflected, thereby reducing the effect of the stray light on the normal working performance of the optical emitting device, the optical receiving device, or the optical transceiving device.

In some embodiments, θ1=120 degrees. The light ray incident to the first side 131*a* can be reflected and emergent out of the first groove 131 in the direction away from the first through hole 115, or can be reflected multiple times within the first groove 131, thus facilitating actual processing.

Further, when the width of the first groove 131 is fixed, a deeper depth of the groove is realized, thereby facilitating effective attenuation of the energy of the stray light by increasing the number of reflections of the light ray between the first side 131*a* and the second side 131*b* of the first groove 131. This reaches the approximate extinction effect, so that the effect of the stray light on the normal working performance of the optical emitting device and/or the optical receiving device can be reduced. Additionally, in an actual processing process, θ1=120 degrees facilitates machining.

In some embodiments, 145 degrees<θ1<180 degrees, θ2=90 degrees. When a light ray, which is located on the side of the first normal direction 1311*a* away from the first through hole 115, and is within an angle range θ3 between the direction parallel to the first end surface 1120 and the first normal direction 1311*a*, and is incident to the first side 131*a*, and after the light ray is reflected by the first side 131*a*, at least one portion of the light ray can be emergent out of the first groove 131 in the direction away from the first through hole 115. However, when the light ray, which is located on the side of the first normal direction 1311*a* close to the first through hole 115, and is within the angle range θ4 between the first normal direction 1311*a* and the direction parallel to the first end surface 1120, is incident to the first side 131*a*, after the light ray is reflected by the first side 131*a*, the light ray can be emergent out of the first groove 131 or be incident to the second side 131*b* in the direction away from the first through hole 115 and can be reflected multiple times in the first groove 131. The first groove 131 provided in this example prevents the light ray incident to the first groove 131 from overlapping with the normal optical path of the optical module 100 after being reflected, thereby reducing the effect of stray light on the normal working performance of the optical emitting device, the optical receiving device, or the optical transceiving device.

As shown in FIGS. 9 and 10, in the forgoing embodiments, due to θ2=90 degrees, according to the reflection law of light, a light ray incident to the first groove 131 from outside of the first groove 131 and directly incident to the second side 131*b* can be reflected multiple times within the first groove 131. A light ray reflected by the first side 131*a* and incident to the second side 131*b* is reflected at least twice within the first groove 131. The light ray reflected within the first groove 131 effectively attenuates the energy of the stray light to the appropriate extinction effect, so that a light ray incident to the second side 1310*a* can be prevented from overlapping with the normal optical path of the optical module 100 after being reflected. This further reduces the effect of the stray light on the normal working performance of the optical transmitting device, the optical receiving device, or the optical receiving device.

Further, in some embodiments, |θ2-90 degrees|≤a first preset value, where |X| is an absolute value of a numerical value X. The first preset value can be set according to an actual need, and is not limited in the present application. In some embodiments, the first preset value is a positive number close to 0, such as 0.5 degrees, 0.8 degrees, 1 degree, and so on, and is not limited in the present application. The closer to 90 degrees θ2, when the width of the first groove 131 is the same, the deeper the first groove 131, the more the number of times that the light rays are reflected within the first groove 131, so that the energy of the stray light is more effectively attenuated.

Figure 11:
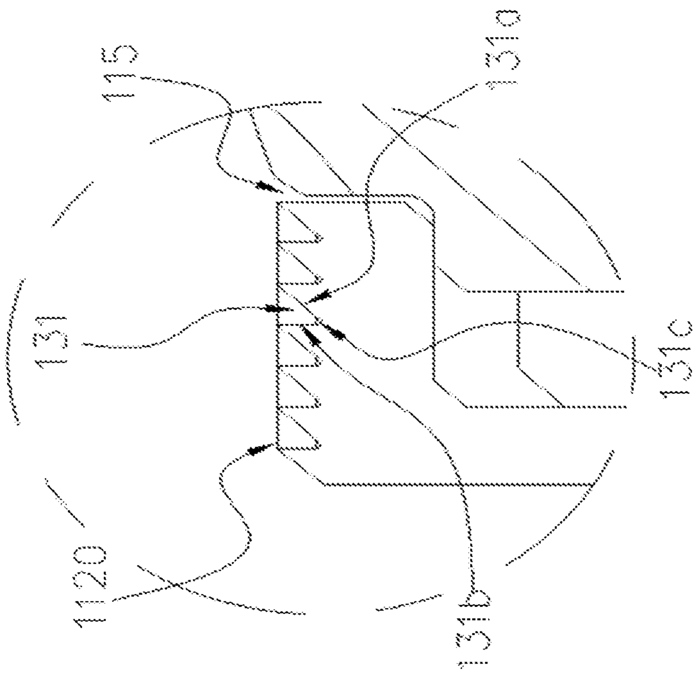
FIG. 11 is a partial structural diagram of a first light-blocking structure in an embodiment of the present application (both sides of a first groove are perpendicular to an end surface)

As shown in FIG. 11, in another exemplary embodiment, θ1=90 degrees; θ2=90 degrees. At this time, a light ray incident to the first side 131*a* and the second side 131*b* can be reflected multiple times between the first side 131*a* and the second side 131*b*. Therefore, the energy of the stray light can be effectively attenuated to the approximate extinction effect. Therefore, the effect of the stray light on the normal working performance of the optical emitting device and/or the optical receiving device can be reduced. When the width of the first groove 131 is constant, increasing the depth of the first groove 131 is convenient to increase the number of reflections of the light ray. Therefore, the energy of the stray light can further be attenuated, and the extinction effect is improved. When the depth of the first groove 131 is constant, reducing the width of the first groove 131 is also convenient to increase the number of reflections of the light ray. Therefore, the energy of the stray light can further be attenuated, and the extinction effect is improved.

As shown in FIGS. 5 and 6, in an exemplary embodiment, the first groove 131 can be arranged in a full circle in a circumferential direction of the first through hole 115. Therefore, the first groove 131 can block or extinguish a stray light incident to the first end surface 1120 at the same distance and at different azimuths, thereby further effectively ensuring the normal working performance of the optical module 100.

Figure 7:
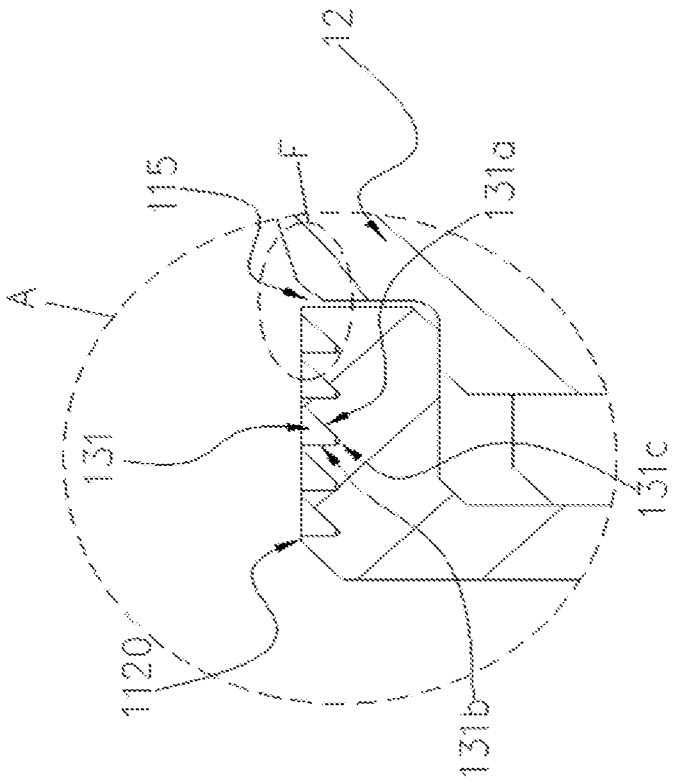
FIG. 7 is an enlarged schematic diagram at A in FIG. 6.
Figure 8:
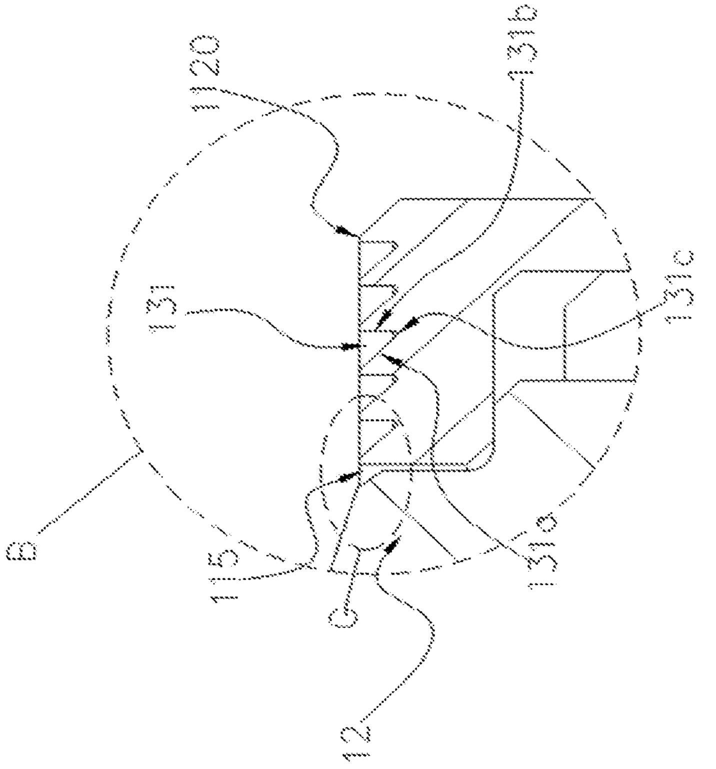
FIG. 8 is an enlarged schematic diagram at B in FIG. 6.

As shown in FIGS. 6 to 8, when the first extinction structure 13 is arranged on the first end surface 1120, and the first extinction structure 13 includes the plurality of first grooves 131, in an exemplary embodiment, the plurality of first grooves 131 can be arranged in intervals in order to reduce the difficulty of processing. Further, in order to reduce the difficulty of the processing while ensuring an effective light-blocking effect and/or extinction effect, a spacing between two adjacent first grooves 131 arranged in the intervals is within a second preset range, to avoid the spacing between two adjacent first grooves 131 to be too large. That is, if a plane area on the first end surface 1120 is too large, the light ray incident to the plane area of the first end surface 1120 cannot be effectively blocked or eliminated, and a light-blocking effect of the first extinction structure 13 is weakened. A second preset value can be a numerical value pre-calculated by those skilled in the art through theoretical calculation, or can be determined by those skilled in the art based on the theoretical calculation who combine with a large number of experimental tests to achieve improved extinction effect, or can be determined by those skilled in the art directly based on a large number of experimental tests to achieve the improved extinction effect. This solution does not limit this herein.

In some embodiments, the second preset range can be greater than or equal to 0.05 millimeters and less than or equal to 1 millimeter.

Figure 12:
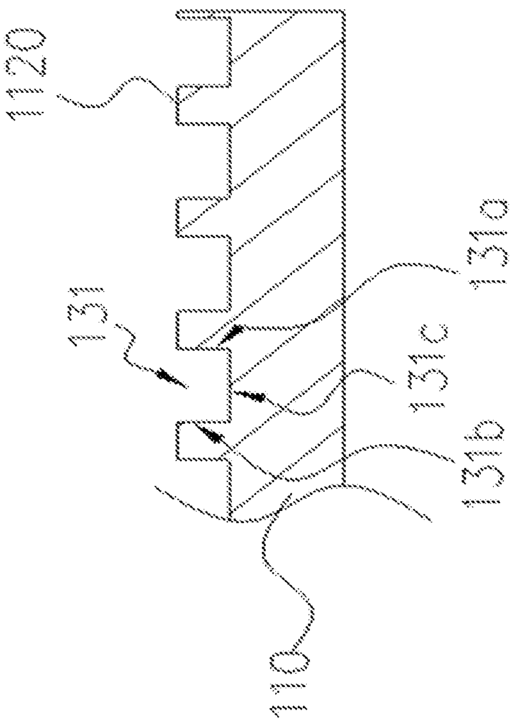
FIG. 12 is another partial schematic diagram of a first light-blocking structure according to an embodiment of the present application (a plurality of first grooves are arranged continuously)

As shown in FIGS. 11 and 12, in an exemplary embodiment, the plurality of first grooves 131 can be arranged continuously in a radial direction of the first through hole 115. That is, the first side 131*a* and the second side 131*b* of the two adjacent first grooves 131 are directly connected. Therefore, the plurality of first grooves 131 can block or extinguish the stray light incident to a region where the first groove 131 is arranged on the first end surface 1120, thereby increasing a light-blocking or extinction area of the first end surface 1120, and further effectively ensure the normal working performance of the optical module 100.

Further, the first side 131*a* of one of the plurality of first grooves 131 closest to the first through hole 115 is connected to an edge of the first through hole 115. The second side 1310*a* of one of the plurality of first grooves 131 furthest away from the first through hole 115 is connected to an edge of the first end surface 1120. That is, the plurality of first grooves 1130 are substantially fully distributed with the first end surface 1120, so that the stray lights incident to the first end surface 1120 at different positions all can have the light-blocking or extinction effect. This increases the light-blocking or extinction area of the first end surface 1120, which can effectively ensure the normal working performance of the optical module 100.

As shown in FIGS. 9 and 10, when the plurality of first grooves 131 are spaced apart, and 90 degrees<θ1<180 degrees, |θ2-90 degrees|≤the first preset value, if the width of the first groove 131 is constant, the depth of the first groove 131 can be increased by reducing the included angle θ1 and/or bringing θ2 close to 90 degrees, so as to increase the number of reflections of the light ray. Therefore, the energy of the stray light can be further attenuated, and the extinction effect is improved. That is, the deeper the depth of the first groove 131, the better the light-blocking effect of the first extinction structure 131. When the depth of the first groove 131 is constant, the width of the first groove 131 can be reduced by reducing the included angle θ1 or bringing θ2 close to 90 degrees, so as to increase the number of reflections of the light ray. Therefore, the energy of the stray light can be further attenuated, and the extinction effect is improved. That is, when the plurality of first grooves 131 are spaced apart, the closer to vertical the first side 131*a* and the second side 131*b* of the first groove 131 are, the better the extinction effect.

As shown in FIG. 11, in some embodiments, when the plurality of first grooves 131 are spaced apart, and θ1=90 degrees, θ2=90 degrees, the first groove 131 further includes a first bottom surface 131*c*. The first bottom surface 131*c* is connected between bottoms of the first side surface 131*a* and the second side surface 131*b*. At this time, when the width of the first groove 131 is constant, increasing the depth of the first groove 131 is convenient to increase the number of reflections of the light ray, and can further attenuate the energy of the stray light, thereby improving the extinction effect. That is, the deeper the depth of the first groove 131, the better the light-blocking effect of the first light extinction structure 13. When the depth of the first groove 131 is constant, reducing the width of the first groove 131 can also increase the number of reflections of the light ray. Therefore, the energy of the stray light can further be attenuated, and the extinction effect is improved.

Further, an inner wall surfaces of the first grooves 131 are all coated with extinction material, so that the stray light can be absorbed by the extinction material while being reflected by the inner wall surfaces of the first grooves 131. The first groove 131 in the first extinction structure 13 reflects the light rays and cooperates with the extinction material to absorb the light, which can further effectively improve the extinction effect and reduce the effect of the stray light on the optical module 100. In some embodiments, when the first groove 131 includes the first side surface 131*a* and the second side surface 131*b*, the first side surface 131*a* and the second side surface 131*b* can be coated with the extinction material. When the first groove 131 includes the first side surface 131*a*, the second side surface 131*b*, and the first bottom surface 131*c*, the first side surface 131*a*, the second side surface 131*b*, and the first bottom surface 131*c* can be coated with the extinction material. When the plurality of the first grooves 131 are spaced apart, a region of the first end surface 1120 that is not provided with the first groove 131 can also be coated with the extinction material.

In an exemplary embodiment, the extinction material is an extinction paint. The extinction paint has a low reflection effect on a certain light via a microscopic particulated surface or a densely porously packed structure, so as to achieve absorption and extinction. In another exemplary embodiment, the first extinction structure 13 is also provided on the second end surface 1130. A first groove 131 arranged on the second end surface 1130 extends in a circumferential direction of the second through hole 116. A first side of the first groove 131 arranged on the second end surface 1130 is a side wall close to the second through hole 116, and a second side thereof is a side wall remote from the second through hole 116. A specific structure of the first extinction structure 13 arranged on the second end surface 1310 can be the same as the first extinction structure 13 arranged on the first end surface 1130 from the forgoing embodiments, which is not repeated here.

Further, as shown in FIG. 6, the optical module 100 further includes a second extinction structure 140. The second extinction structure 140 is arranged on at least a portion of the inner wall surface 1140, for preventing a light ray at least partially incident on the inner wall surface 1140 from overlapping with the normal optical path of the optical module 100 after the light ray is reflected. Additionally, the optical module 100 provided in the present application is provided with the second extinction structure 140 on at least a portion of the inner wall surface 1140, so that for light rays incident to or emergent out of the light-transmitting cavity 1110, light rays with angles within a preset incident angle range and a preset emergent angle range are incident to or emergent out of the light-transmitting cavity 1110 via the light-transmitting channel consisting of the light-transmitting cavity 1110, the first through hole 115, and the second through hole 116. After light rays with angles outside the preset incident angle range and/or the preset emergent angle range are reflected by the second extinction structure 140 on the inner wall surface 1140, the light rays are transmitted in a direction away from the normal optical path of the optical module 100 and/or are reflected by the second extinction structure 140 multiple times. Afterwards, the energy of the light rays is effectively dissipated to reach the approximate extinction effect, thereby further reducing the effect of the stray light on the normal operating performance of the optical emitting device, the optical receiving device, or the optical transceiving device.

It can be understood that the second extinction structure can also be referred to as the second light-blocking structure. After at least a portion of the light rays with incident angles outside the preset incident angle range and/or the preset emergent angle range are incident to the second extinction structure, the light rays are blocked by the second extinction structure. After the light rays are transmitted toward the direction away from the normal light path and/or are reflected by the second extinction structure multiple times, the energy of the light rays is effectively dissipated to reach the approximate extinction effect, thereby further reducing the effect of the stray light on the normal operating performance of the optical emitting device, the optical receiving device, or the optical transceiving device.

Figure 13:
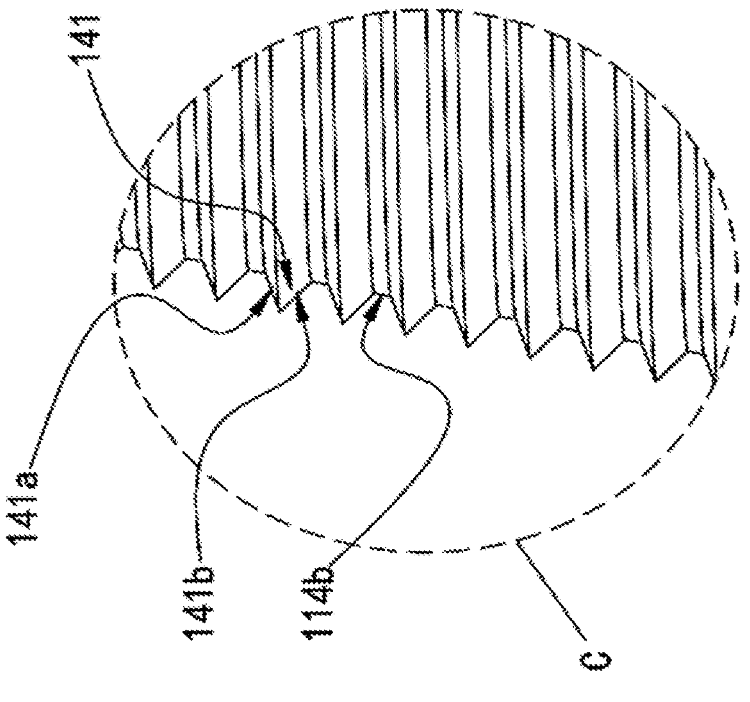
FIG. 13 is an enlarged schematic diagram at C in FIG. 6.
Figure 14:
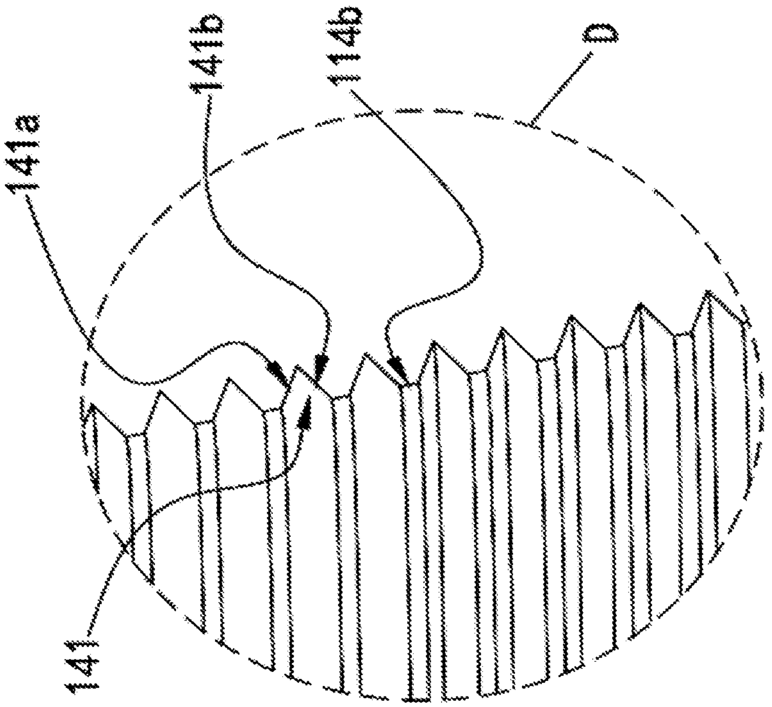
FIG. 14 is an enlarged schematic diagram at D in FIG. 6.

Referring to FIGS. 6, 13, and 14, in an exemplary embodiment, the second extinction structure 14 is provided on a portion of the inner wall surface 1140. The second extinction structure 14 includes a second groove 141. The second groove 141 extends in a circumferential direction of the light-transmitting cavity 1110. The second groove 141 is arranged on at least a portion of the inner wall surface 1410 of the light-transmitting cavity 1110, so that light (i.e., the light ray in the normal optical path range) with the angle in the preset incident angle range and the preset emergent angle range is normally emergent out through the light-transmitting cavity 1110. After at least a portion of the light rays with the angles outside the preset incident angle range and/or the preset emergent angle range are incident to the second groove 141, the light rays are blocked by the second groove 141. After the light rays are transmitted in the direction away from the normal optical path and/or are reflected by the second groove 141 multiple times, the energy of the light rays is effectively dissipated to reach the approximate extinction effect, thereby further reducing the effect of the stray light on the normal operating performance of the optical emitting device, the optical receiving device, or the optical transceiving device.

It can be understood that the second extinction structure 14 further includes the first light-blocking structure. The first light-blocking structure can include a plurality of first light-blocking sheets. The first light-blocking sheet includes a third side surface 141*a* and a fourth side surface 141*b*. The second groove 141 is formed between the two first light-blocking sheets. The plurality of first light-blocking sheets are arranged and spaced apart in a first preset direction, and extend in a circumferential direction of at least a portion of a vacant wall surface 114*b*.

It can be understood that the second extinction structure further includes the second light-blocking structure. The second light-blocking structure is arranged on at least a portion of the vacant wall surface and extends in the circumferential direction of at least a portion of the vacant wall surface. The light-transmitting cavity is arranged between the first light-blocking structure and the second light-blocking structure. It can be understood that the second light-blocking structure and the first light-blocking structure can be symmetrically arranged along the light-transmitting cavity. The second light-blocking structure can include a plurality of second light-blocking sheets. The second groove 141 is formed between the two second light-blocking sheets. The second light-blocking sheet includes the third side 141*a* and the fourth side 141*b*.

It can be understood that the shape of the optical module 100 can be cylindrical, square cylindrical, or other shapes, which are not specifically limited to the embodiments of the present application. Taking the square cylindrical shape of the optical module 100 as an example, the optical module 100 has the plurality of inner wall surfaces. The first light-blocking structure and the second light-blocking structure are located on both symmetrical sides of the light-transmitting cavity of the optical module, respectively. When the optical module 100 is in the cylindrical shape, the first light-blocking structure and the second light-blocking structure are on two symmetrical wall surfaces of the light-transmitting cavity in a direction of an optical axis.

Further, as shown in FIG. 6, the inner wall surface 1140 includes a bearing wall surface 114*a* for bearing on the optical element 12 and the vacant wall surface 114*b* for not bearing on the optical element 12. A space surrounded by the bearing wall surface 114*a* is configured to accommodate the optical element 12. A space surrounded by the vacant wall surface 114*b* is configured to provide the light-transmitting channel for the light ray. At least a portion of the vacant wall surface 114*b* is provided with the second groove 141 described above, so that the light rays with the angles within the preset incident angle range and the preset emergent angle range are normally emergent out of the light-transmitting cavity 1110 after passing through the optical element 12 in the light-transmitting cavity 1110 and the space surrounded by the vacant wall surface 114*b*. After the light rays with the angles outside the preset incident angle range and/or the preset emergent angle range is incident to the second groove 141, the light rays are blocked by the second groove 141. After the light rays are transmitted in the direction away from the normal optical path and/or are reflected by the second groove 141 multiple times, the energy of the light rays is effectively dissipated to reach the approximate extinction effect, thereby further reducing the effect of the stray light on the normal operating performance of the optical emitting device, the optical receiving device, or the optical transceiving device.

In some exemplary embodiments, the optical module 100 includes one or more optical elements 12. The inner wall surface 1140 within the light-transmitting cavity 1110 includes one section of the continuous vacant wall surface 114*b* or a plurality of sections of the spaced-apart vacant wall surfaces 114*b*. When the inner wall surface 1140 includes a plurality of sections of the spaced-apart vacant wall surfaces 114*b*, the bearing wall surface 114*a* is arranged between adjacent two spaced-apart vacant wall surfaces 114*b*. When the optical element 12 includes one optical element 12, if the optical element 12 is arranged at one end of the light-transmitting cavity 1110 close to the first through hole 115 or at one end of the light-transmitting cavity 1110 close to the second through hole 116, the vacant wall surface 114*b* is a portion of the inner wall surface 1140 located between one side of the optical element 12 away from the first through hole 115 and the second through hole 116. Alternatively, the vacant wall surface 114*b* is a portion of the inner wall surface located between one side of the optical element 12 away from the second through hole 116 and the first through hole 115. At this time, the vacant wall surface 114*b* is a section of the continuous wall surface. If the optical element 12 is arranged between the first through hole 115 and the second through hole 116, the inner wall surface 114*b* includes two sections of the spaced-apart vacant wall surfaces 114*b*. The two sections of the spaced-apart vacant wall surfaces 114*b* include a portion of the wall surface between the side of the optical element 12 close to the first through hole 115 and the first through hole 115 and a portion of the wall surface between the side of the optical element 12 close to the second through hole 116 and the second through hole 116, respectively.

When the optical module 100 includes two optical elements 12, if the two optical elements 12 are arranged at one end of the light-transmitting cavity 1110 close to the first through hole 115 and one end of the light-transmitting cavity 1110 close to the second through hole 116, respectively, the vacant wall surface 114*b* is a portion of the wall surface between the two optical elements 12. At this time, the vacant wall surface 114*b* is a section of the continuous wall surface. If at least one of the two optical elements 12 is arranged between the first through hole 115 and the second through hole 116, the inner wall surface 1140*b* includes at least two sections of the spaced-apart vacant wall surfaces 114*b*. When the optical module 100 includes three or more optical elements 12, it can be understood that at least one optical element 12 is arranged between the first through hole 115 and the second through hole 116. At this time, the inner wall surface 1140*b* includes at least two sections of the spaced-apart vacant wall surfaces 114*b*.

Further, in order to ensure the light-blocking effect of the second extinction structure 140 inside the light-transmitting cavity 1110 while reducing the difficulty of the processing, in an exemplary embodiment, when a section of the independently arranged vacant wall surface 114*b* has a width greater than a third preset value, the second groove 141 can be arranged on the section of the vacant wall surface 114*b*. It can be understood that the third preset value is a width of an opening of at least one second groove 141. In some embodiments, the third preset value is the width of the openings of the three second grooves 141, which is not limited in the present application. Those skilled in the art can deduce an approximate size of the second groove 141 according to an actual required extinction effect, and then determine a size of the second groove 141 by combining with a large number of experimental tests to improve the extinction effect. Then it is determined if the second groove 141 is provided at this section of the vacant wall surface 114*b* according to design of a width of the vacant wall surface 114*b*. The third preset value can be designed according to actual needs, and the present application does not make any specific limitations.

That is, when a section of the independently arranged vacant wall surface 114*b* has a width greater than the third preset value, it indicates that a size of the inner wall surface 1140 (the vacant wall surface 114*b*) between two adjacent optical elements 12 is relatively large in the direction of the optical path. A large amount of the stray light may be reflected on the inner wall surface 1140 between two adjacent optical elements 12, which has a large impact on the optical module 100. At this time, the second groove 141 is arranged on the vacant wall surface 114*b* between two adjacent optical elements 12, so that the effect of the stray light on the optical module 100 is reduced. However, when the inner wall surface 1140 between the two adjacent optical elements 12 has a smaller size in the direction of the optical path, fewer stray lights are incident to the inner wall surface 1140 between the two adjacent optical elements 12. At this time, the inner wall surface 1140 between the two adjacent optical elements 12 cannot be provided with the second extinction structure 14, thereby reducing production costs.

As shown in FIG. 6, in an exemplary embodiment, four optical elements 12 are provided. The two optical elements 12 are arranged at one end of the light-transmitting cavity 1110 close to the first through hole 115 and one end of the light-transmitting cavity 1110 close to the second through hole 116. The other two optical elements 12 are spaced apart within the light-transmitting cavity 1110. At this time, the inner wall surface 1140 includes three sections of the spaced-apart vacant wall surfaces 114*b*. The inner wall surface 1140 between each of the two adjacent optical elements 120 is a section of the vacant wall surface 114*b*. A width of the vacant wall surface 114*b* between the two optical elements 12 close to the first end surface 1120 is relatively small, and the vacant wall surface 114*b* between the two optical elements 12 close to the first end surface 1120 are not provided with the second groove 141. Widths of the other two vacant wall surfaces 114*b* are relatively large, and the two optical elements 12 are both provided with the second groove 141.

As shown in FIG. 6, in an exemplary embodiment, the second groove 141 can be arranged in a full revolution in a circumferential direction of the vacant wall surface 114*b* where the second groove is located. Therefore, the second groove 141 is capable of having the blocking or extinction effect for the large-angle stray light incident to the vacant wall surface 114*b* at different azimuths, thereby further effectively ensuring the normal operating performance of the optical module 100.

Additionally, since the second groove 141 is arranged in a relatively arranged state in the circumferential direction of the vacant wall surface 114*b*, the light ray can also be reflected between the second grooves 141 on the opposite sides, so as to increase the number of reflections of the light ray, thereby further improving the light-blocking effect.

As shown in FIGS. 6, 10 and 11, the plurality of second grooves 141 are arranged on each section of the vacant wall surface 114*b*. In an exemplary embodiment, the plurality of second grooves 141 can be spaced apart, thereby effectively reducing the difficulty of processing the plurality of second grooves 141 on the inner wall surface 1140. Further, in order to reduce the difficulty of the processing while ensuring the effective light-blocking effect and/or extinction effect, a spacing between two adjacent spaced-apart second grooves 141 is less than a fourth preset value, to avoid the spacing between two adjacent second grooves 141 to be too large. That is, if a plane area on the inner wall surface 1140 is too large, the light ray incident to the plane area of the inner wall surface 1140 cannot be effectively blocked or eliminated, and the light-blocking effect of the first extinction structure 14 is weakened. The fourth preset value can be a numerical value pre-calculated by those skilled in the art through theoretical calculation, or can be determined by those skilled in the art based on the theoretical calculation who combine with a large number of experimental tests to achieve improved extinction effect, or can be determined by those skilled in the art directly based on a large number of experimental tests to achieve the improved extinction effect. This solution does not limit this herein.

In some embodiments, the fourth preset value can be greater than or equal to 0.05 millimeters and less than or equal to 1 millimeter.

In another exemplary embodiment, the plurality of second grooves 141 can be arranged continuously in a width direction of the vacant wall surface 114*b*. Therefore, an area of the vacant wall surface 114*b* for light blocking is further increased, and the number of reflections of the light ray can be increased, further improving the light-blocking effect.

As shown in FIGS. 13 and 14, the second groove 141 can include the third side 141*a* and the fourth side 141*b*. The third side 141*a* and the fourth side 141*b* of the same second groove 141 are directly adjacent. In an exemplary embodiment, the third side 141*a* and the fourth side 141*b* of the same second groove 141 are connected by a bottom surface.

As shown in FIGS. 13 and 14, in some embodiments, included angles between the third side surface 141*a* and the fourth side surface 141*b* as well as the vacant wall surface 114*b* are both obtuse angles. If a width of the second groove 141 is constant, a depth of the second groove 141 can be increased by making the third side surface 141*a* and the fourth side surface 141*b* close to the vacant wall surface 114*b*, so as to increase the number of reflections of the light rays. Therefore, the energy of the stray light can be further attenuated, and the extinction effect is improved. That is, the deeper the depth of the second groove 141, the better the corresponding extinction effect. When the depth of the second groove 141 is constant, the width of the first groove 131 is reduced by making the third side surface 141*a* and the fourth side surface 141*b* close to be perpendicular to the vacant wall surface 114*b*. Therefore, the number of reflections of the light ray can also be increased. The energy of the stray light is further attenuated. The extinction effect is improved. That is, when the plurality of second grooves 141 are spaced apart, the closer the third side 141*a* and the fourth side 141*b* are to the vacant wall surface 114*b*, the better the extinction effect.

Further, an inner wall surfaces of the second grooves 141 are all coated with the extinction material, so that the stray light can be absorbed by the extinction material while being reflected by the inner wall surfaces of the second grooves 141. The second extinction structure 14 reflects the light rays via the second groove 141 and cooperates with the extinction material to absorb the light, which can further effectively improve the extinction effect and reduce the effect of the stray light on the optical module 100. In some embodiments, when the plurality of second grooves 141 are spaced apart, a region of the inner wall surface 1140 that is not provided with the second grooves 141 can also be coated with the extinction material.

Referring to FIGS. 5 and 6, in an exemplary embodiment, a shape of a space surrounded by each section of the vacant wall surface 114*b* can match the optical path range of the corresponding optical element 12 (i.e., an angle range of the light rays capable of being incident to or emergent out of the optical element 12), so as to ensure that the light ray located within a normal optical path range of the optical element 12 cannot be blocked by the inner wall surface 1140. A light ray whose angle is outside the normal optical path range of the optical element 12 can be incident to the inner wall surface 1140. The second light-blocking structure 140 arranged on the inner wall surface 1140 prevents the light ray at least partially incident to the inner wall surface 1140 from overlapping with the normal optical path of the optical module 100 after the light ray is reflected.

In some embodiments, the optical module 100 only includes the first extinction structure 13. The first extinction structure 13 is arranged on the first end surface 1120 or the second end surface 1130, or the first extinction structure 13 is arranged on the first end surface 1120 and the second end surface 1130 at the same time. In an exemplary embodiment, the optical module 100 includes only the second extinction structure 140. The second extinction structure 140 is arranged on at least a portion of the inner wall surface 1140. In another exemplary embodiment, the optical module 100 includes the first extinction structure 13 and the second extinction structure 14 at the same time. The first extinction structure 130 is arranged on the first end surface 1120 or the second end surface 1130, or the first extinction structure 130 is arranged on the first end surface 1120 and the second end surface 1130 at the same time. The second extinction structure 140 is arranged on at least a portion of the inner wall surface 1140.

Still referring to FIGS. 5 and 6, in some embodiments, the first structure 110 is assembled from a plurality of independently arranged components. For example, the first structure includes a barrel body 117 and a first limiting member 118. At least one first limiting member 118 is provided, and is arranged at one end of the barrel body 117 for limiting a position of the optical element 12 arranged at the end.

As shown in FIG. 6, in an exemplary embodiment, the first structure 110 includes two first limiting members 118. The two first limiting members 118 are arranged at both ends of the barrel body 117, respectively, for limiting positions of the two optical elements 12 arranged in the first through hole 115 and the second through hole 116, respectively, so that the two optical elements 12 arranged in the first through hole 115 and the second through hole 116 are fixedly mounted on the barrel body 117 and do not fall off from the barrel body 117. End surfaces of the two first limiting members 118 at both ends are the first end surface 1120 and the second end surface 1130, respectively. At this time, design can be made according to types and shapes of the two optical elements 12 arranged at both ends as needed, and the same structure can be adopted, or different structures can also be adopted.

In another exemplary embodiment, the first structure 110 includes one first limiting member 118. The first limiting member 118 arranged at one end of the barrel body 117 for limiting a position of the one optical element 12 arranged in the first through hole 115 or the second through hole 116 so that the one optical element 12 arranged in the first through hole 115 or the second through hole 116 is fixedly mounted on the barrel body 117 and does not fall out of the barrel body 117. An end surface of the first limiting member 118 is a first end surface 1120 or a second end surface 1130. The optical element 12 arranged on one end of the barrel body 117 that is not provided with the first limiting member 118 can be fixedly mounted on the barrel body 117 by glue.

Still referring to FIG. 6, in an exemplary embodiment, when the optical module 100 includes four optical elements 12, the four optical elements 12 are recorded as a first optical element, a second optical element, a third optical element, and a fourth optical element in a direction from the first end surface 1120 to the second end surface 1130, respectively. The first structure member 110 further includes one second limiting portion 1191 and two second limiting members 1192. The second limiting portion 1191 is connected to the inner wall surface 1140, protrudes from the inner wall surface 1140 and is located between the second optical element and the third optical element for abutting against and being connected to the second optical element and the third optical element to limit positions thereof and prevent movement thereof. One of the two second limiting portions 1192 is arranged between the first optical element and the second optical element for abutting against and being connected to the first optical element and the second optical element to limit positions thereof and prevent movement thereof. The other one of the two second limiting members 1192 is arranged between the third optical element and the fourth optical element for abutting against and being connected to the third optical element and the fourth optical element to limit positions thereof and prevent movement thereof.

In the present embodiment, the second limiting portion 1191 can be fabricated in an integrally formed manner with the barrel body 117. The second limiting members 1192 are two components independent of the barrel body 117. In other embodiments, the second limiting portion 1191 can also adopt a component independent of the barrel body 117. In general, the first limiting member 118 is commonly referred to as a pressing ring. The second limiting member 1192 is commonly referred to as a locking ring.

In some embodiments, the vacant wall surface 114*b* includes an inner wall surface of the second limiting portion 1191 and an inner wall surface of the two second limiting members 1192. In some embodiments, the second limiting portion 1191 and the vacant wall surface 114*b* corresponding to the one second limiting member 1192 arranged between the third optical element and the fourth optical element are provided with the second groove 141. The second limiting member 1192 arranged between the first optical element and the second optical element has a too small size and hence is not provided with the second groove 141.

Figure 18:
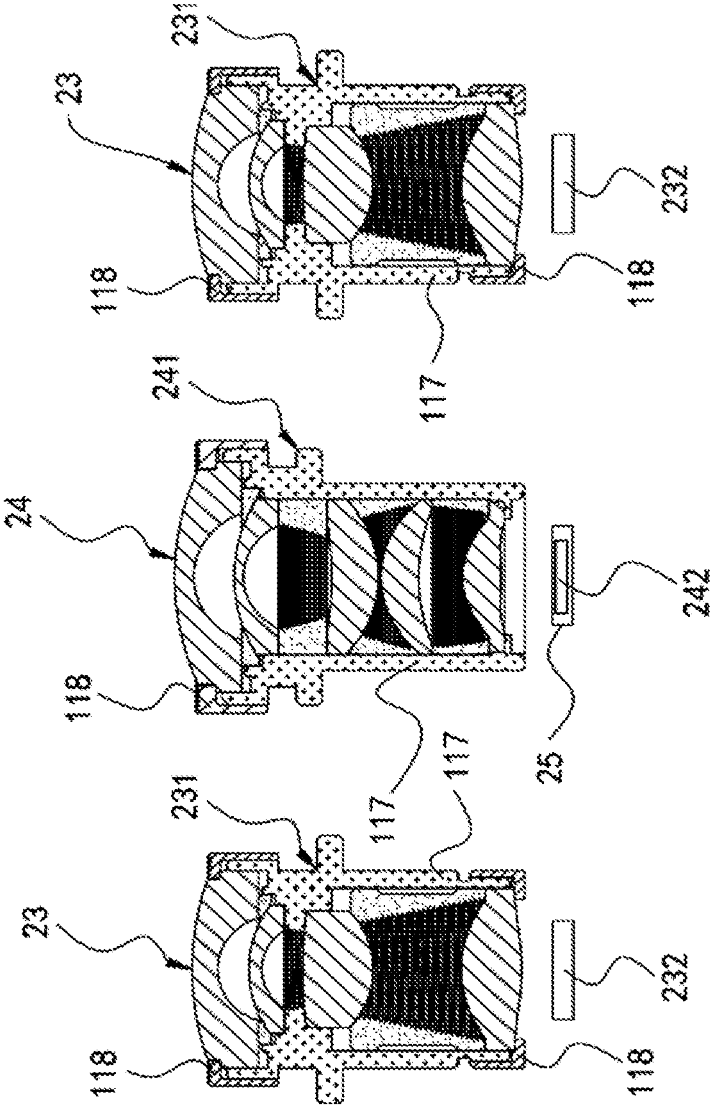
FIG. 18 is a structural schematic diagram of a laser emitting module and a laser receiving module according to an embodiment of the present application.

In some embodiments, the optical module 100 can include other numbers of optical elements 12. As shown in FIG. 18, when the optical module 100 is applied to a laser receiving module. The optical module 100 can include five optical elements. The number and positions of the respective limiting members and the limiting portions in the optical module 100 can be set in accordance with actual needs, and the present application is not limited thereto.

Still referring to FIG. 6, in an exemplary embodiment of the present application, the optical element 12 includes a light guide region 121 for conducting the light ray and a vacant region 122 not for conducting the light ray. At least a portion of the vacant region 122 is coated with the extinction material. The extinction material can be used to absorb a stray light incident to the vacant region 122. Taking the optical element 12 of a lens as an example, the vacant region 122 generally includes a portion of an incident light surface of the lens close to an edge, a portion of an emergent light surface of the lens close to the edge, and a peripheral side of the lens. More specifically, the vacant region 122 includes a portion of the lens abutting against the second limiting member 1192 and a peripheral side of the lens. The extinction material can be the extinction paint.

In a second aspect, based on the forgoing optical module, embodiments of the present application further provide a laser emitting module. The laser emitting module includes a laser emitter and a laser emitting lens. The laser emitting lens adopts the optical module in any of the forgoing embodiments. In some embodiments, the laser emitter is configured to generate a divergent laser beam with a certain divergent angle. The laser emitting lens is located on an emergent light side of the laser emitter, and configured to receive a divergent laser beam emitted by the laser emitter, and emit a detection beam to a detection region after a divergent angle of the divergent laser beam is reduced and a field-of-view angle thereof is expanded. Among them, reduction processing for the divergent angle can also be generally referred to as collimation processing. Expansion processing for the field-of-view angle can also be referred to as beam expansion processing.

Further, one end of a first structure body 110 corresponding to the laser emitting lens away from the laser emitter is a first end surface 1120 of the laser emitting lens. That is, an end surface of the first structure body 110 corresponding to the laser emitting lens close to the emergent light side thereof is the first end surface 1120, and the first extinction structure 13 is arranged on the first end surface 1120.

In a third aspect, based on the optical module described above, embodiments of the present application further provide a laser receiving module. The laser receiving module includes a laser receiving lens and a laser detector. The laser receiving lens adopts an optical module described in any of the above embodiments. In some embodiments, the laser receiving lens is located on an incident light side of the laser detector, and is configured to receive an echo light beam of the detection light beam that is reflected by a target object in a detection region, and converge the echo light beam on the laser detector after a field-of-view angle of the echo light beam is reduced and the echo light beam is converged. A reduction processing for the field-of-view angle is also generally called a beam reduction processing.

Further, the laser detector is provided thereon with a protection window for protecting a laser detection chip. In some embodiments, the protection window is coated with a light filtering material, which can be configured to filter a light ray that does not need to be used, and select the echo light beam to converge on the laser detection chip. Compared with the related art, it is necessary to arrange a light filtering sheet on an emergent light side of the laser receiving lens to filter the unnecessary light, and select the echo light beam. The echo light beam is reflected between the light filtering sheet and the protection window to form a stray light. The laser receiving module provided in the present application filters the light by coating the protection window with the light filtering material, and can no longer be provided with a separate light filtering sheet, so as to avoid the light from being reflected between the protection window and the filter to form the stray light in the related art.

Further, one end of a first structure body 11 corresponding to the laser emitting lens away from the laser detector is a first end surface 1120 of the laser receiving lens. That is, an end surface of the first structure body 110 corresponding to the laser receiving lens close to the incident light side thereof is the first end surface 1120. The first extinction structure 130 is arranged on the first end surface 1120.

EXAMPLE 2

Figure 15:
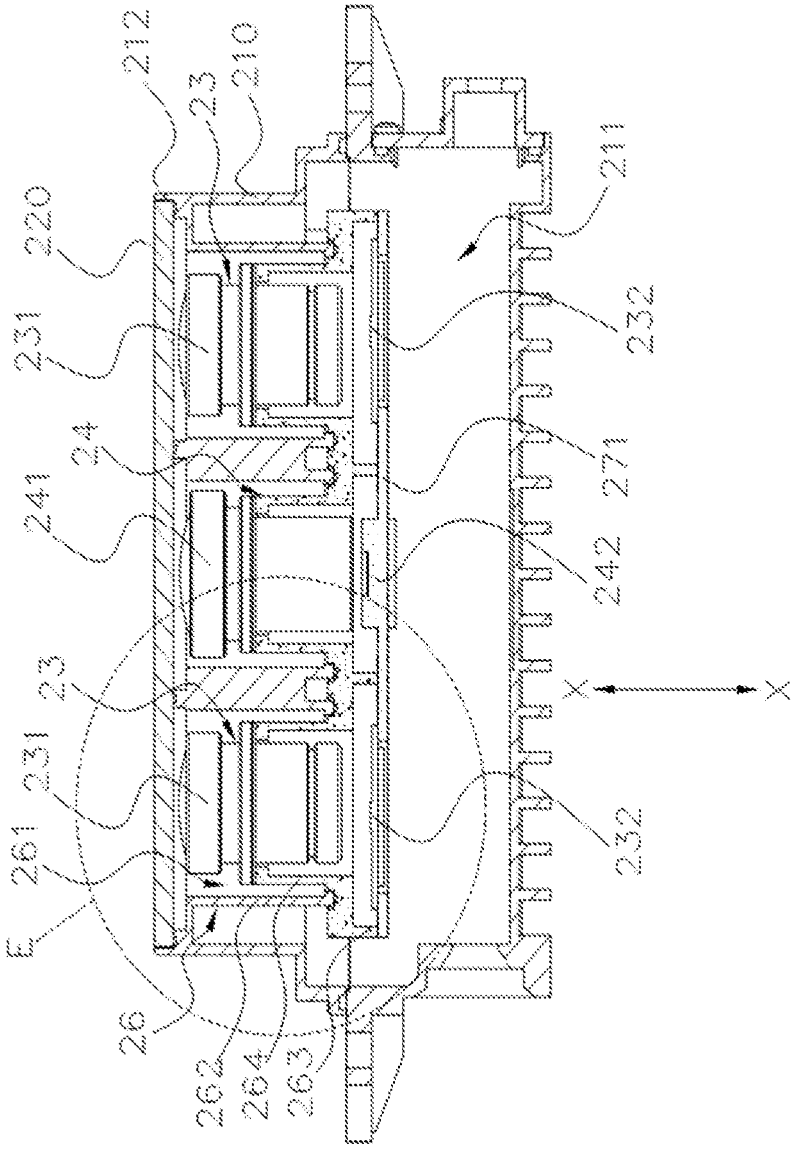
FIG. 15 is a structural schematic diagram of a laser ranging device according to an embodiment of the present application.
Figure 16:
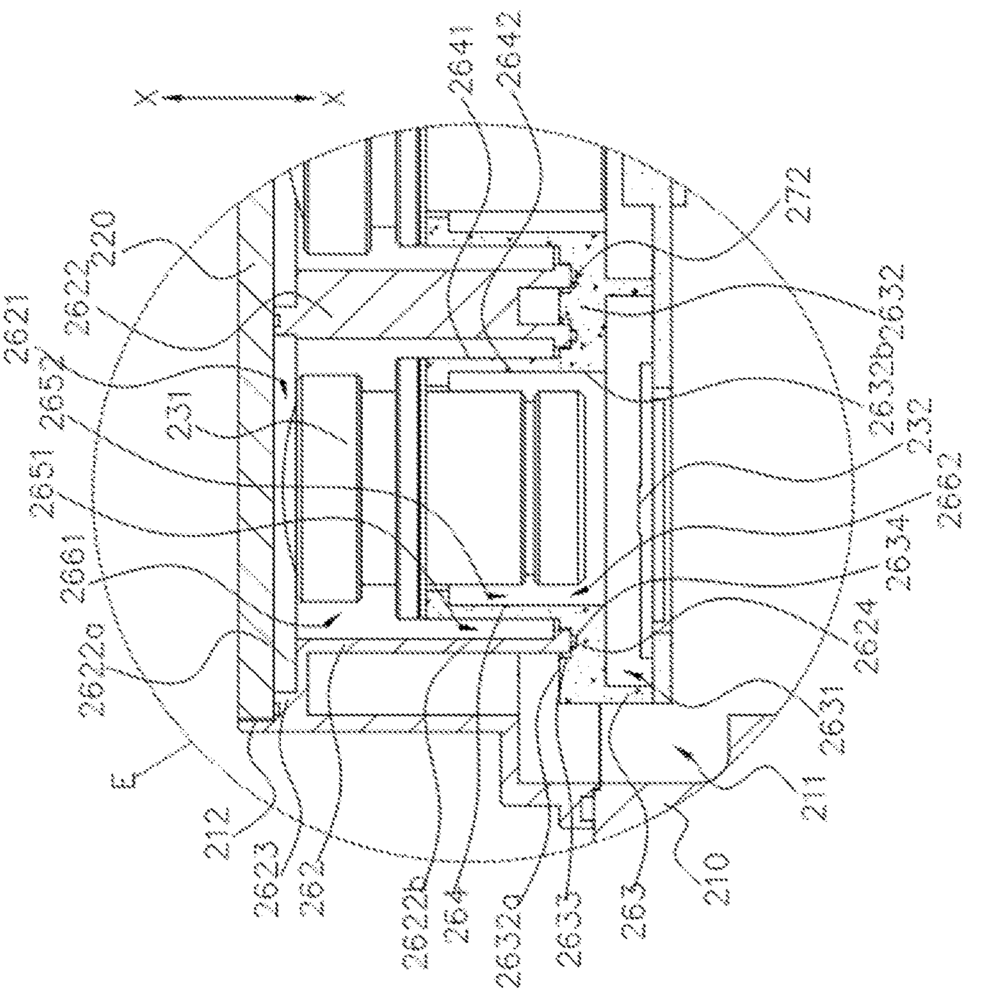
FIG. 16 is an enlarged schematic diagram of E in FIG. 11.
Figure 17:
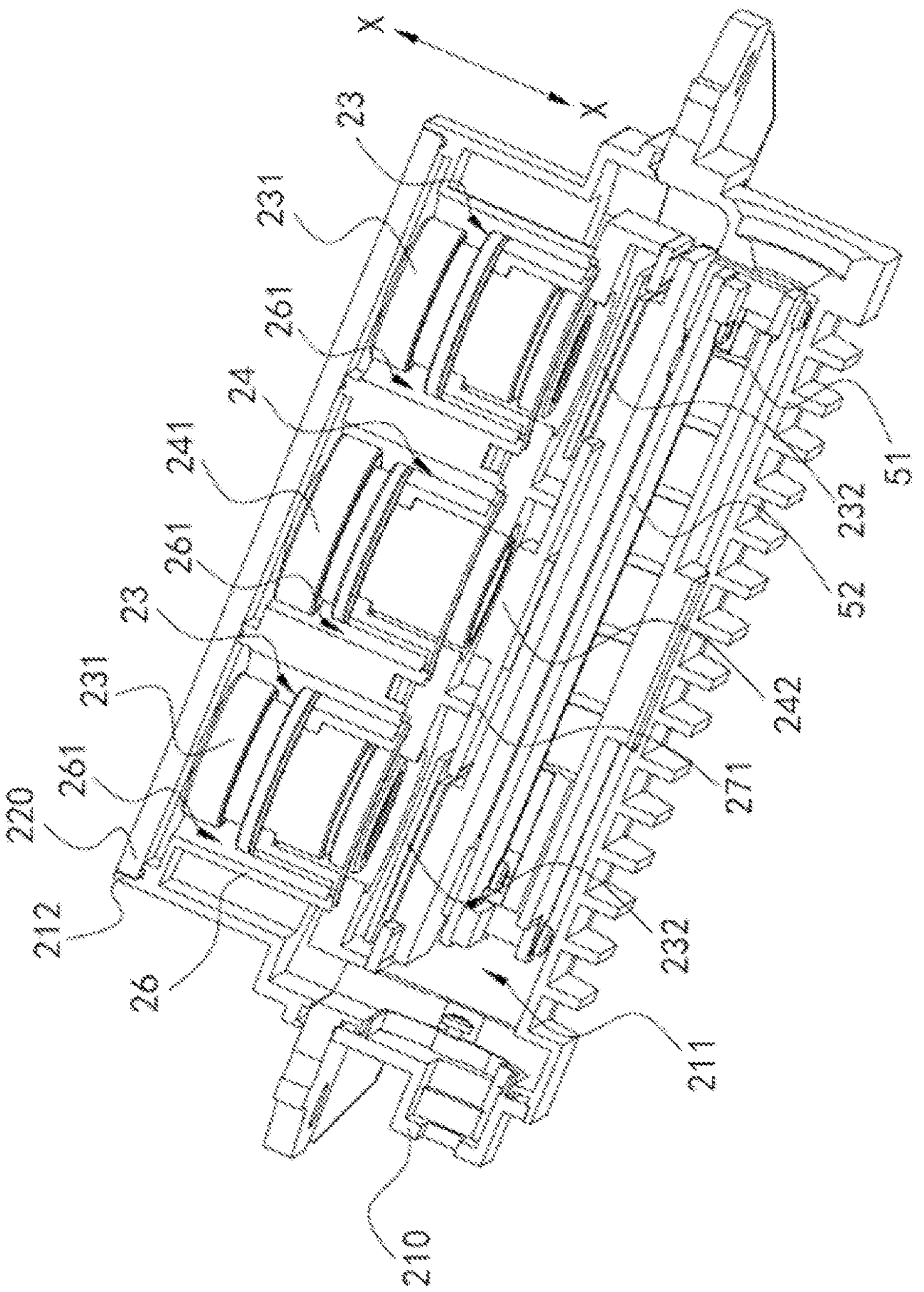
FIG. 17 is a structural schematic diagram of a laser ranging device according to an embodiment of the present application.

As shown in FIGS. 15 to 17, Example 2 of the present application further provides a laser ranging device. The laser ranging device includes a housing 210, a light-transmitting sheet 220, a laser transmitting module 23, and a laser receiving module 24. The housing 210 has a receiving cavity 211. One side of the housing 210*a* is provided with a third opening 212. The light-transmitting sheet 220 is capped at the third opening 212 for allowing a light ray to be incident to or emergent out of the receiving cavity 211. The laser transmitting module 23 is located in the receiving cavity 211. The laser transmitting module 23 includes a laser emitting lens 231 and a laser emitter 232. The laser receiving module 24 is located in the receiving cavity 211. The laser receiving module 24 includes a laser receiving lens 241 and a laser detector 242. The laser ranging device is an optical transceiving device and can be LIDAR. The laser emitting module 23 is an optical emitting device for generating a laser beam. The laser beam is incident to a target object in a detection region as a detection light beam. The laser receiving module 24 is a laser receiving device for receiving an echo light beam reflected back from the target object and outputting corresponding electrical signals. Then, the electrical signals corresponding to the echo light beam are processed by a signal processing device to form a point cloud map. By processing the point cloud map, distance, azimuth, height, speed, attitude, shape, and other parameters of the target object can be obtained, thus realizing a laser detection function, which can be applied to navigation avoidance, obstacle recognition, ranging, speed measurement, autonomous driving, and other scenarios of an automobile, a robot, a logistics vehicle, a patrol vehicle, and other products.

In some embodiments, the laser emitting module 23 adopts the laser emitting module of Example 1. The laser receiving module 24 adopts the laser receiving module of Example 1.

In some embodiments, the housing 210 is configured to protect components such as the laser emitting module 23 and the laser receiving module 24. The housing 210 can be made using plastic, metal, or resin. The housing 210 can be cylindrical, square cylindrical, or other shapes. The light-transmitting sheet 220 is made of a light-transmitting material. The light-transmitting material can be a light-transmitting glass, a light-transmitting plastic, a light-transmitting resin, or the like. The light-transmitting sheet 220 can be circular, square, or other shapes. A thickness of the light-transmitting sheet 220 can be selected according to actual needs, and the present application is not limited thereto.

Further, the laser ranging device further includes a third light-blocking structure 26 located within the receiving cavity 211. The third light-blocking structure 26 has at least two hollow chambers 261 extending in a first preset direction XX. One laser emitting module 23 or the laser receiving module 24 is arranged within each of the hollow chambers 261. An inner side wall surface of the hollow chamber 261 is arranged around an outer periphery of the laser emitting module 23 or the laser receiving module 24. one end of the hollow chamber 261 close to the third opening 212 is attached to the light-transmitting sheet 220 to block the stray light from being incident to the laser emitting module 23 or the laser receiving module 24.

It can be understood that the laser ranging device provided in Example 2 of the present application is arranged around the outer periphery of the laser emitting module 23 or the laser receiving module 24 by the hollow chamber 261 of the third light-blocking structure 26, and one end of the hollow chamber 261 close to the third opening 212 is attached to the light-transmitting sheet 220, so that even if a light ray outside the hollow chamber 261 is reflected on an inner surface of the light-transmitting sheet 220 to form the stray light, because of blocking of the third light-blocking structure 26, the light ray outside the hollow chamber 261 is not reflected by the inner surface of the light-transmitting sheet 220 to the laser emitting module 23 or the laser receiving module 24. Meanwhile, a light ray reflected by other structures inside the housing 210, such as an optical module in the laser emitting module 23, is not incident to the optical modules 10 in the laser receiving module 24 because of the blocking of the third light-blocking structure 26, so that a large amount of stray lights can be avoided from being reflected to the corresponding optical module 10, which can affect proper functioning of the optical modules 10.

In some embodiments, the stray light includes a light ray reflected to the first end surface 1120 corresponding to the laser emitting module 23 and the laser receiving module 24 via the inner surface of the light-transmitting sheet 220, a light ray incident to the vacant wall surface **114*b* within the light-transmitting cavity 1110**, a light ray reflected via a planar portion of the lens, etc. The stray light can cause high anti-crosstalk, ghost shadows in point-cloud data, and so on, thereby affecting ranging and imaging of the laser ranging device.

Referring to FIGS. 15 to 17, in some embodiments, the third light-blocking structure 26 includes a first light-blocking portion 262 and a second light-blocking portion 263 connected to the first light-blocking portion 262. The first light-blocking portion 262 has a first hollow chamber 2621 extending in the first preset direction XX. An inner side wall surface of the first hollow chamber 2621 is arranged around an outer periphery of one end of the optical module 100 close to the third opening 212. One end of the first hollow chamber 2621 close to the third opening 212 is attached to the light-transmitting sheet 220. The second light-blocking portion 263 has a second hollow chamber 2631 extending in the first preset direction XX. An inner side wall surface of the second hollow chamber 2631 is arranged around an outer periphery of one end of the optical module 10 away from the light-transmitting sheet 220. The second light-blocking portion 263 is configured to be connected to one end of the first hollow chamber 2621 away from the third opening 212. When the second light-blocking portion 263 is connected to the first light-blocking portion 262, the second hollow chamber 2631 and the first hollow chamber 2621 are communicated to form the hollow chamber 261.

It should be noted that the hollow chamber 261 is formed by the first hollow chamber 2621 located in the first light-blocking portion 262 and the second hollow chamber 2631 located in the second light-blocking portion 263. The first light-blocking portion 262 is fabricated separately from the second light-blocking portion 263 to facilitate installation and placement of the optical modules 100 within the hollow chamber 261. In some embodiments, the first light-blocking portion 262 and the second light-blocking portion 263 can be detachably connected by a screw, a bolt or the like.

Further, the first light-blocking portion 262 includes a first hollow barrel structure 2622. One end of the first hollow barrel structure 2622 close to the third opening 212 extends radially and is formed with a first plate surface **2622*a*. The first plate surface 2622*a* has a first through hole 2622*b* thereon. One side of the first plate surface 2622*a* toward the third opening 212 is surrounded and provided with a first protrusion structure 2623. An accommodation space defined by an inner side wall surface of the first protrusion structure 2623 is communicated with a receiving space defined by an inner side wall surface of the first hollow barrel structure 2622 via the first through hole 2622*b* to form the first hollow chamber 2621. The first protrusion structure 2623 is located on one side of the receiving cavity 211 close to the third opening 212 and is configured to be attached to the light-transmitting sheet 220. One end of the first hollow barrel structure 2622 away from the third opening 212 is configured to be connected to the second light-blocking portion 263**.

It can be understood that the first protrusion structure 2623 is configured to provide support for the light-transmitting sheet 220. A mounting groove for placing the first protrusion structure 2623 can be formed between the first protrusion structure 2623 and an inner side wall of the housing 210. Therefore, the light-transmitting sheet 220 can be avoided to protrude from the housing 210, thereby enhancing surface flatness and aesthetics of the laser ranging device.

Referring to FIGS. 15 to 17, in some embodiments, the second light-blocking portion 263 includes a second hollow barrel structure 2632. The second hollow chamber 2631 includes a receiving space defined by an inner side wall surface of the second hollow barrel structure 2632. One end of the second hollow barrel structure 2632 close to the first light-blocking portion 262 extends radially, and is formed with a second plate surface **2632*a*. The second plate surface 2632*a* has a second through hole 2632*b* thereon. The second through hole 2632*b* is configured to communicate the second hollow chamber 2631 with the first hollow chamber 2621. One end of the first light-blocking portion 262 away from the third opening 212 has a first engaging edge 2624. One side of the second plate surface 2632*a* close to the first light-blocking portion 262 is formed with a concave structure or a convex structure arranged around an outer periphery of the second through hole 2632*b*. The concave structure or the convex structure is configured to engage with the first engaging edge 2624 to jointly define the hollow chamber 261 after the first light-blocking portion 262 and the second light-blocking portion 263 are connected. The second light-blocking portion 263 is engaged with the first light-blocking portion 262 via the concave structure or the convex structure, so that connection between the second light-blocking portion 263 and the first light-blocking portion 262 is tighter. The second light-blocking portion 263 and the first light-blocking portion 262 can be positioned and assembled by using the concave structure or the convex structure, so that assembly of the second light-blocking portion 263 and the first light-blocking portion 262 is more convenient. Further, one side of the second plate surface 2632***a* close to the first light-blocking portion 262 is formed with a second limiting groove 2633 arranged around the outer periphery of the second through hole 2632*b*. A bottom surface of the second limiting groove 2633 is recessed downwardly and provided with a second engaging groove 2634. A sealing member 272 is arranged in the second engaging groove 2634, so that one end of the first light-blocking portion 262 close to the second light-blocking portion 263 is sealingly connected to the second light-blocking portion 263 via the sealing member 272 after being limited by the second limiting groove 2633. The second light-blocking portion 263 is positioned and assembled with the first light-blocking portion 262 via the second limiting groove 2633. A connecting part between the first light-blocking portion 262 and the second light-blocking portion 263 is sealed by the sealing member 272. The sealing member 272 can be a rubber sealing ring or a sealing glue filled in the second engaging groove 2634.

The third light-blocking structure 26 further includes a third light-blocking portion 264. The third light-blocking portion 264 includes a first light-blocking wall surface 2641 arranged in a full revolution and a second light-blocking wall surface 2642 arranged in a full revolution. One end of the first light-blocking wall surface 2641 is connected to the inner side wall surface of the hollow chamber 261, and the other end thereof is engaged with an outer side wall surface of the optical module 100, so that the inner side wall surface of the hollow chamber 261 and the outer side wall surface of the optical module 100 form a first extinction chamber 2651 extending in the first preset direction XX. The first extinction chamber 2651 is a semi-enclosed chamber with an opening on one side thereof. An opening end of the first extinction chamber 2651 faces toward the light-transmitting sheet 220, so that a stray light incident to the hollow chamber 261 via a first gap 2661 is reflected multiple times. The first gap 2661 is a gap formed at sides of the inner side wall surface of the hollow chamber 261 and the outer side wall surface of the optical module 100 close to the light-transmitting sheet 220. It can be understood that a stray light reflected on a surface of the light-transmitting sheet 220 to be formed can be incident to the first extinction chamber 2651 via the first gap 2661. After the stray light reflected on the surface of the light-transmitting sheet 220 to be formed is incident to the first extinction chamber 2651, the stray light is reflected by plurality of times in the first extinction chamber, thus achieving an objective of extinction. This can prevent the stray light reflected on the surface of the light-transmitting sheet 220 to be formed from being incident to the optical module 10, thereby further improving an elimination effect of the laser ranging device on the stray light.

One end of the second light-blocking wall surface 2642 is connected to the inner side wall surface of the hollow chamber 261, and the other end thereof is engaged with the outer side wall surface of the optical module 100. The second light-blocking wall surface 2642 is farther from the light-transmitting sheet 220 compared to the first light-blocking wall surface 2641. The second light-blocking wall surface 2642, the inner side wall surface of the hollow chamber 261, and the outer side wall surface of the optical module 100 form a second extinction chamber 2652 extending in the first preset direction XX. The second extinction chamber 2652 is a semi-enclosed chamber with an opening at one side thereof. An opening end of the second extinction chamber 2652 faces away from the third opening 212 so that the stray light incident to the hollow chamber 261 via a second gap 2662 is reflected multiple times in the second extinction chamber 2652. The second gap 2662 is a gap formed between the inner side wall surface of the hollow chamber 261 and the outer side wall surface of the optical module 100 away from the light-transmitting sheet 220. It can be understood that a stray light formed by the reflection of light device 61 can be incident to the first extinction chamber 2652 via the second gap 2662. After the stray light formed by the reflection of light device 61 is incident to the first extinction chamber 2652, the stray light is reflected a plurality of times in the second extinction chamber, thus achieving extinction. This can prevent the stray light formed by the reflection of light device 61 from being incident to the optical module 10, thereby further facilitating the elimination of the stray light.

Further, the opening end of the first extinction chamber 2651 has a width greater than that of a relatively arranged closed end, so that the stray light formed by the reflection of the surface of the light-transmitting sheet 220 is incident to the first extinction chamber 2651. Additionally, the width of the first extinction chamber 2651 is narrowed, which can shorten the time for each reflection of the stray light in the first extinction chamber 2651, and improve the number of reflections of the stray light in the first extinction chamber 2651 to achieve better extinction.

In some embodiments, an opening end of the second extinction chamber 2652 has a width greater than that of a relatively arranged closed end, so that the stray light formed by the reflection of the light device 220 is incident to the second extinction chamber 2652. Additionally, the width of the second extinction chamber 2652 is narrowed, which can shorten the time for each reflection of the stray light in the second extinction chamber 2652, and improve the number of reflections of the stray light in the second extinction chamber 2652 to achieve better extinction.

In one embodiment, inner side wall surfaces of the first extinction chamber 2651 and the second extinction chamber 2652 are coated with an extinction material. Two extinction methods of reflective extinction and absorption extinction can be used simultaneously in the first extinction chamber 2651 and the second extinction chamber 2652 to eliminate the stray light, thereby achieving better extinction. The extinction material can be aluminum stearate, zinc, calcium salt, tung oil, wax, and other materials.

In an exemplary embodiment, the inner side wall surfaces of the first extinction chamber 2651 and the second extinction chamber 2652 are coated with an extinction paint. The extinction paint has a low reflection effect on a certain light via a microscopic particulated surface or a densely porously packed structure, so as to achieve absorption and extinction.

In another exemplary embodiment, the inner side wall surfaces of the first extinction chamber 2651 and the second extinction chamber 2652 adopt a metal matte black anodizing process to reduce light reflectance and achieve the absorption and the extinction.

Referring to FIGS. 15 to 17, the laser ranging device can further include a first plate body 271. One end of the optical module 100 away from the light-transmitting sheet 220 is arranged on the first plate body 271. One end of the hollow chamber 261 away from the third opening 212 is connected to the first plate body 271. One end of the hollow chamber 261 away from the third opening 212 is capped with by the first plate body 271. The hollow chamber 261 can be enclosed by the first plate body 271, so that the optical module 100 is in the enclosed hollow chamber 261. Taking a space excluding the hollow chamber 261 in the receiving chamber 211 as a remaining space as an example, a space within the hollow chamber 261 is isolated from the remaining space, so that a stray light in the space excluding the hollow chamber 261 in the receiving chamber 211 can be prevented from being incident to the hollow chamber 261. A device within the remaining space is not needed to be extinguished, which can reduce product costs.

In one embodiment, the housing 210 can include a first housing and a second housing arranged opposite to the first housing. The first housing can be connected to the second housing and form the receiving cavity 211. The third opening 212 is provided on one side of the first housing away from the second housing. The light-transmitting sheet 220 is capped at the third opening 212 on the first housing. In some embodiments, the first housing can be detachably connected to the second housing for ease of installation. For example, the first housing can be detachably connected to the second housing by a screw or a bolt, etc.

Further, a sealing ring can be provided at a connecting part of the first housing and the second housing. The connecting part of the first housing and the second housing is sealed with the sealing ring to prevent moisture from entering the receiving cavity. The sealing ring can be a rubber sealing ring, a plastic sealing ring, or a metal sealing ring.

In one embodiment, the laser ranging device further includes an extinction cotton located on one side of the light-transmitting sheet 220 close to the third light-blocking structure 26. The extinction cotton is arranged around a peripheral side of the light-transmitting sheet at an edge of the light-transmitting sheet 220. It can be understood that the extinction cotton can eliminate a stray light from an edge region of the light-transmitting sheet 220, so that a surface of a connecting part of the housing 210 and the light-transmitting sheet 220 need not be extinguished. Therefore, the housing 210 can be manufactured in an injection molded manner to reduce production costs. The extinction cotton is generally annular in shape. The extinction cotton has an opening hole for a light ray to pass through. The light ray is incident to or emergent out of the receiving cavity 211 via the opening hole. A specific size and a shape of the opening hole can be designed according to an optical path of the optical module 100 to avoid affecting normal operation of an optical assembly.

As shown in FIG. 18, in some embodiments, two laser emitting modules 23 are provided, and one laser receiving module 24 provided. The two laser emitting modules 23 are located on two opposite sides of the laser receiving modules 24, respectively. A combination of emitted field of views of the two laser emitting modules 23 matches a received field of view of the laser receiving module 24. By combining the emitted field of views of the two laser emitting modules 23, the laser ranging device provided in the example of the present application cannot only improve a field-of-view receiving rate of the laser receiving module 24, but also expand a detecting field-of-view angle of the laser ranging device. In some embodiments, the emitted field of view of the laser emitting module 23 can be substantially a rectangular pyramid. The received field of view of the laser receiving module 24 can be substantially the rectangular pyramid. The rectangular-pyramid field of view can be roughly divided into a lateral field of view and a longitudinal field of view. A combination of the emitted field of views of the two laser emitting modules 23 matches the received field of view of the laser receiving module 24 as follows: a combination of lateral emitted field of views of the two laser emitting modules 23 matches a lateral received field of view of the laser receiving module 24, and a combination of longitudinal emitted field of views of the two laser emitting modules 23 matches a longitudinal received field of view of the laser receiving module 24. Further, the present application provides an extinction system and a laser ranging device to solve a problem that a stray light may affect normal operation of an optical assembly.

EXAMPLE 3

Figure 19:
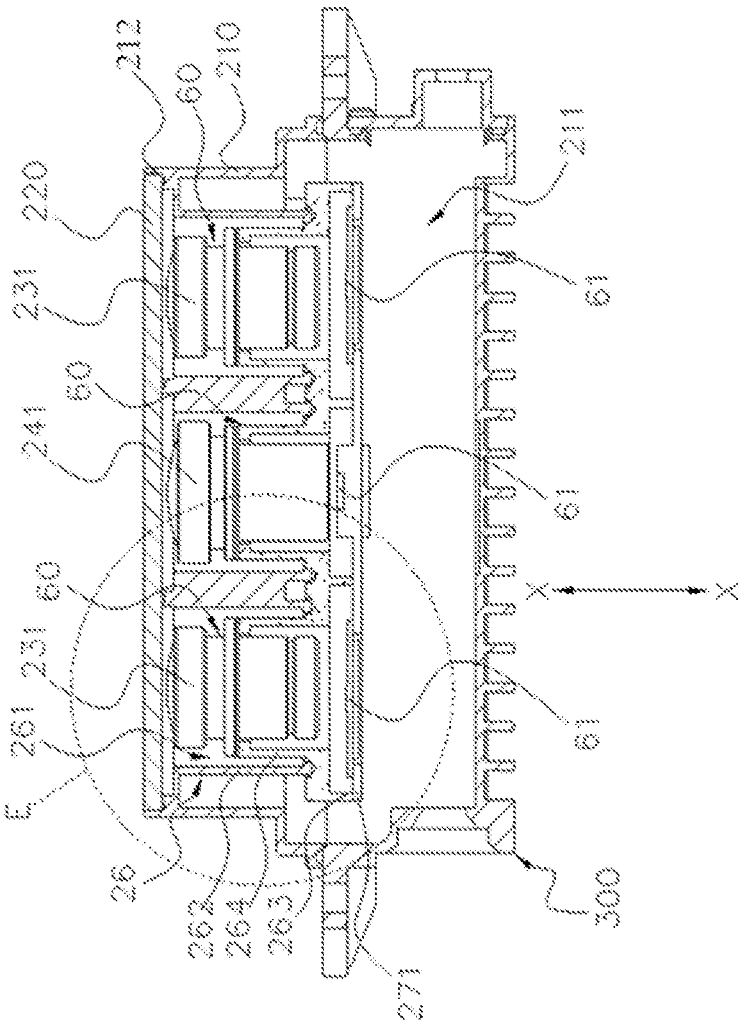
FIG. 19 is a structural schematic diagram of an extinction system according to an embodiment of the present application.
Figure 20:
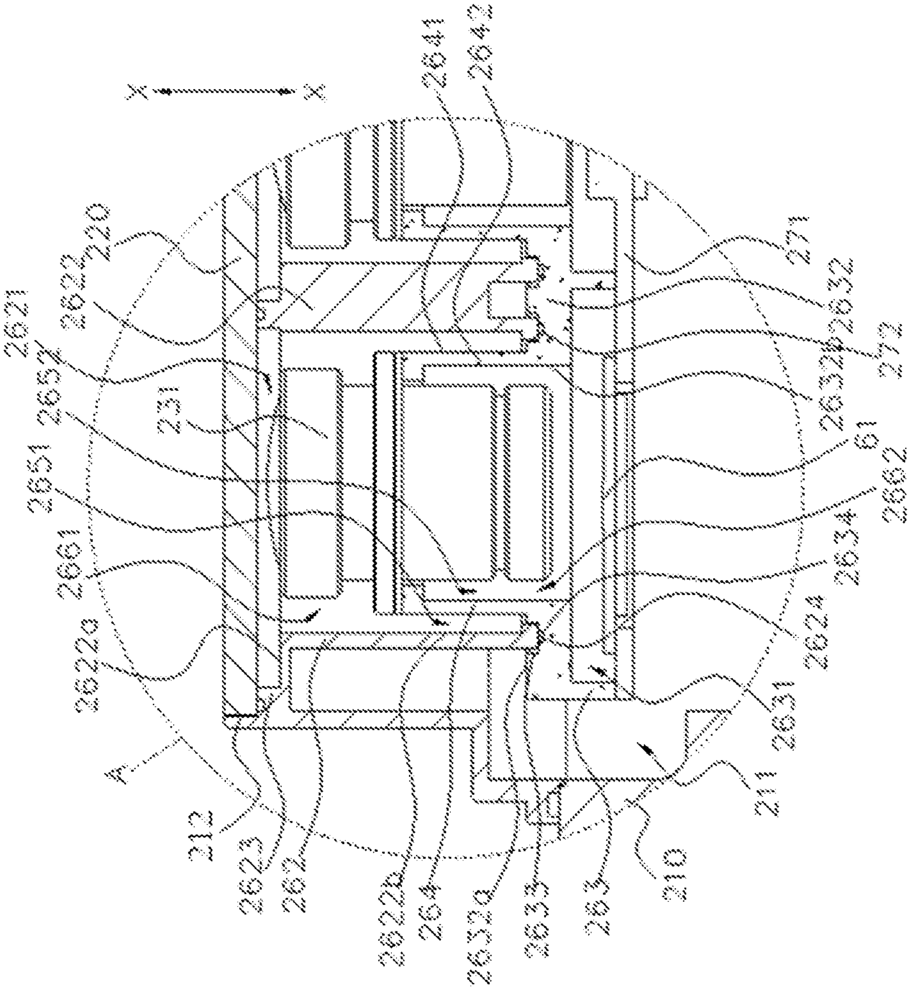
FIG. 20 is an enlarged schematic diagram at A in FIG. 19.
Figure 21:
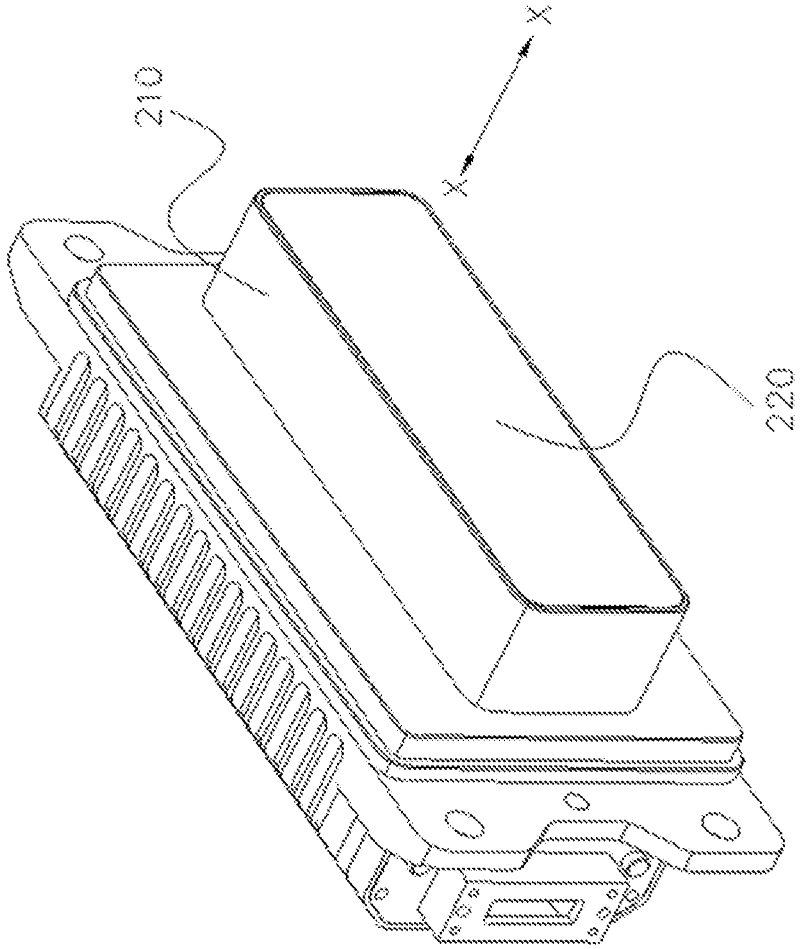
FIG. 21 is a structural schematic diagram of a laser ranging device according to an embodiment of the present application.

Example 3 of the present application provides an extinction system 300. As shown in FIGS. 19 and 20, the extinction system 300 is configured to extinguish an optical assembly 60. The extinction system 300 includes a housing 210, a light-transmitting sheet 220, and a third light-blocking structure 26. The housing 210 has a receiving cavity 211. One side of the housing **210*a* is provided with a third opening 212. The light-transmitting sheet 220 is capped at the third opening 212. The third light-blocking structure 26 is located in the receiving cavity 211. The third light-blocking structure 26 has a hollow chamber 261 extending in a first preset direction XX. The hollow chamber 261 is configured to arrange the optical assembly 60. The optical assembly 60 is configured to emit or receive a light ray. The light ray is incident to or emergent out of the hollow chamber 261 via the light-transmitting sheet 220. An inner side wall surface of the hollow chamber 261 is arranged around an outer periphery of the optical assembly 60. One end of the hollow chamber 261 close to the third opening 212 is attached to the light-transmitting sheet 220 to prevent a stray light from being incident to the optical assembly 60**.

The optical assembly 60 can be a laser emitting module, a laser receiving module, or other modules. The housing 210 is configured to protect components such as the optical assembly 60. A preparation material of the housing 210 can be plastic, metal, or resin. The housing 210 can be cylindrical, square cylindrical, or other shapes. The light-transmitting sheet 220 is configured so that the light ray is incident to or emergent out of the hollow chamber 261. The light-transmitting sheet 220 is made of a light-transmitting material. The light-transmitting material can be a light-transmitting glass, a light-transmitting plastic, a light-transmitting resin, or the like. The light-transmitting sheet 220 can be circular, square, or other shapes. A thickness of the light-transmitting sheet 220 can be selected according to actual needs, and the present application is not limited thereto.

It can be understood that in Example 3 of the present application, an inner side wall surface of the hollow chamber 261 is arranged around the outer periphery of the optical assembly 60. One end of the hollow chamber 261 close to the third opening 212 is attached to the light-transmitting sheet 220, so that even if a light ray outside the hollow chamber 261 is reflected on an inner surface of the light-transmitting sheet 220 to form a stray light, because of blocking of the light-blocking structure 13, the light ray outside the hollow chamber 261 is not reflected by the inner surface of the light-transmitting sheet 220 to the optical assembly 60. At the same time, a light ray reflected by other structures inside the housing, such as other light-blocking structures, is not incident to the optical assembly 60 because of the blocking of the light-blocking structure, so that a large amount of stray lights can be avoided from being reflected into the optical assembly 60, which may affect normal operation of the optical assembly 60.

It should also be noted that taking the extinction system 300 applied to a laser ranging device as an example, the laser ranging device includes a laser emitting module, a laser receiving module, and other modules. The laser emitting module is configured to generate a laser beam. The laser beam is configured as a detection light beam to be incident to a target object in a detection area according to a preset detecting field-of-view angle. The laser receiving module is configured to receive a detection echo light beam reflected back from a target object and output corresponding electrical signals. Then, the signal processing device appropriately processes the electrical signals corresponding to the detection echo light beam to form a point cloud map. By processing the point cloud map, distance, azimuth, height, speed, attitude, shape, and other parameters of the target object can be obtained, thus realizing a laser detection function, which can be applied to navigation avoidance, obstacle recognition, ranging, speed measurement, autonomous driving, and other scenarios of an automobile, a robot, a logistics vehicle, a patrol vehicle, and other products. The stray light includes a light ray reflected or scattered into the laser receiving module by an object located in the receiving cavity 211 (such as the inner surface of the light-transmitting sheet 220 or an inner side wall of the receiving cavity 211, other optical assemblies, etc.) in the laser beam emitted by the laser emitting module Still referring to FIGS. 19 and 20, the third light-blocking structure 26 includes a first light-blocking portion 262 and a second light-blocking portion 263 connected to the first light-blocking portion 262. The first light-blocking portion 262 has a first hollow chamber 2621 extending in the first preset direction XX. An inner side wall surface of the first hollow chamber 2621 is arranged around an outer periphery of one end of the optical assembly 60 close to the third opening 212. One end of the first hollow chamber 2621 close to the third opening 212 is attached to the light-transmitting sheet 220. The second light-blocking portion 263 has a second hollow chamber 2631 extending in the first preset direction XX. An inner side wall surface of the second hollow chamber 2631 is arranged around an outer periphery of one end of the optical assembly 60 away from the light-transmitting sheet 220. The second light-blocking portion 263 is configured to be connected to one end of the first hollow chamber 2621 away from the third opening 212. When the second light-blocking portion 263 is connected to the first light-blocking portion 262, the second hollow chamber 2631 and the first hollow chamber 2621 are communicated to form the hollow chamber 261.

It should be noted that the hollow chamber 261 is formed by the first hollow chamber 2621 located in the first light-blocking portion 262 and the second hollow chamber 2631 located in the second light-blocking portion 263. The first light-blocking portion 262 is fabricated separately from the second light-blocking portion 263 to facilitate installation and placement of the optical assembly 60 within the hollow chamber 261. In some embodiments, the first light-blocking portion 262 and the second light-blocking portion 263 can be detachably connected by a screw, a bolt, or the like.

Further, the first light-blocking portion 262 includes a first hollow barrel structure 2622. One end of the first hollow barrel structure 2622 close to the third opening 212 extends radially and is formed with a first plate surface 2622*a*. The first plate surface 2622*a* has a first through hole 2622*b* thereon. One side of the first plate surface 2622*a* toward the third opening 212 is surrounded and provided with a first protrusion structure 2623. A receiving space defined by an inner side wall surface of the first protrusion structure 2623 is communicated with a receiving space defined by an inner side wall surface of the first hollow barrel structure 2622 via the first through hole 2622*b* to form the first hollow chamber 2621. The first protrusion structure 2623 is located on one side of the receiving cavity 211 close to the third opening 212 and is configured to be attached to the light-transmitting sheet 220. One end of the first hollow barrel structure 2622 away from the third opening 312 is configured to be connected to the second light-blocking portion 263.

It can be understood that the first protrusion structure 2623 is configured to provide support for the light-transmitting sheet 220. A mounting groove for placing the first protrusion structure 2623 can be formed between the first protrusion structure 2623 and an inner side wall of the housing 210. Therefore, the light-transmitting sheet 220 can be avoided to protrude from the housing 210, thereby enhancing surface flatness and aesthetics of the extinction system 300.

Still referring to FIGS. 19 and 20, in some embodiments, the second light-blocking portion 263 includes a second hollow barrel structure 2632. The second hollow chamber 2631 includes a receiving space defined by an inner side wall surface of the second hollow barrel structure 2632. One end of the second hollow barrel structure 2632 close to the first light-blocking portion 262 extends radially, and is formed with a second plate surface 2632*a*. The second plate surface 2632*a* has a second through hole 2632*b* thereon. The second through hole 2632*b* is configured to communicate the second hollow chamber 2631 with the first hollow chamber 2621. One end of the first light-blocking portion 262 away from the third opening 212 has a first engaging edge 2624. One side of the second plate surface 2632*a* close to the first light-blocking portion 262 is formed with a concave structure or a convex structure arranged around an outer periphery of the second through hole 2632*b*. The concave structure or the convex structure is configured to engage with the first engaging edge 2624 to jointly define the hollow chamber 261 after the first light-blocking portion 262 and the second light-blocking portion 263 are connected. The second light-blocking portion 263 is engaged with the first light-blocking portion 262 via the concave structure or the convex structure, so that connection between the second light-blocking portion 263 and the first light-blocking portion 262 is tighter. The second light-blocking portion 263 and the first light-blocking portion 262 can be positioned and assembled by using the concave structure or the convex structure, so that assembly of the second light-blocking portion 263 and the first light-blocking portion 262 is more convenient.

Further, one side of the second plate surface 2632*a* close to the first light-blocking portion 262 is formed with a second limiting groove 2633 arranged around the outer periphery of the second through hole 2632*b*. A bottom surface of the second limiting groove 2633 is recessed downwardly and provided with a second engaging groove 2634. A sealing member 272 is arranged in the second engaging groove 2634, so that one end of the first light-blocking portion 262 close to the second light-blocking portion 263 is sealingly connected to the second light-blocking portion 263 via the sealing member 272 after being limited by the second limiting groove 2633. The second light-blocking portion 263 is positioned and assembled with the first light-blocking portion 262 via the second limiting groove 2633. A connecting part between the first light-blocking portion 262 with the second light-blocking portion 263 is sealed by the sealing member 272. The sealing member 272 can be a rubber sealing ring or a sealing glue filled in the second engaging groove 2634.

Still referring to FIGS. 19 and 20, the optical assembly 60 includes a light device 61 and an optical module 100 arranged in a first preset direction XX. The optical module 100 is located between the light-transmitting sheet 220 and the light device 61. The light device 61 can be a laser emitter or a laser detector. The optical module 100 can be a transmitting lens or a receiving lens.

The third light-blocking structure 26 further includes a third light-blocking portion 264. The third light-blocking portion 264 includes a first light-blocking wall surface 2641 arranged in a full revolution and a second light-blocking wall surface 2642 arranged in a full revolution. One end of the first light-blocking wall surface 2641 is connected to the inner side wall surface of the hollow chamber 261, and the other end thereof is engaged with an outer side wall surface of the optical module 100, so that the inner side wall surface of the hollow chamber 261 and the outer side wall surface of the optical module 100 form a first extinction chamber 2651 extending in the first preset direction XX. The first extinction chamber 2651 is a semi-enclosed chamber with an opening on one side thereof. An opening end of the first extinction chamber 2651 faces toward the light-transmitting sheet 220, so that a stray light incident to the hollow chamber 261 via a first gap 2661 is reflected multiple times. The first gap 2661 is a gap formed between the inner side wall surface of the hollow chamber 261 and the outer side wall surface of the optical module 100 close to the light-transmitting sheet 220. It can be understood that a stray light formed by the reflection on a surface of the light-transmitting sheet 220 can be incident to the first extinction chamber 2651 via the first gap 2661. After the stray light formed by the reflection on the surface of the light-transmitting sheet 220 is incident to the first extinction chamber 2651, the stray light is reflected multiple times in the first extinction chamber 2651, thus achieving extinction. This can prevent the stray light formed by reflection on the surface of the light-transmitting sheet 220 from being incident to the optical assembly 60, thereby further improving the elimination of the stray light.

One end of the second light-blocking wall surface 2642 is connected to the inner side wall surface of the hollow chamber 261, and the other end thereof is engaged with the outer side wall surface of the optical module 100. The second light-blocking wall surface 2642 is farther from the light-transmitting sheet 220 compared to the first light-blocking wall surface 2641. The second light-blocking wall surface 2642, the inner side wall surface of the hollow chamber 261, and the outer side wall surface of the optical module 100 form a second extinction chamber 2652 extending in the first preset direction XX. The second extinction chamber 2652 is a semi-enclosed chamber with an opening at one side thereof. An opening end of the second extinction chamber 2652 faces towards the light device 61 so that the stray light incident to the hollow chamber 261 via a second gap 2662 is reflected multiple times. The second gap 2662 is a gap formed between the inner side wall surface of the hollow chamber 261 and the outer side wall surface of the optical module 100 away from the light-transmitting sheet 220. It can be understood that a stray light formed by the reflection of light device 61 can be incident to the first extinction chamber 2652 via the second gap 2662. After the stray light formed by the reflection of the light device 61 is incident to the first extinction chamber 2652, the stray light is reflected multiple times in the second extinction chamber, thus achieving the extinction of the stray light. This can prevent the stray light formed by the reflection of the light device 61 from being incident to the optical assembly 60, thereby further facilitating the elimination of the stray light.

Further, the opening end of the first extinction chamber 2651 has a width greater than that of a relatively arranged closed end, so that the stray light formed by the reflection on the surface of the light-transmitting sheet 220 is incident to the first extinction chamber 2651. Additionally, a width of the first extinction chamber 2651 is narrowed, which can shorten the time for each reflection of the stray light in the first extinction chamber 2651, and improve the number of reflections of the stray light in the first extinction chamber 2651 to achieve better extinction.

Still further, an opening end of the second extinction chamber 2652 has a width greater than that of a relatively arranged closed end, so that the stray light formed by the reflection of the light device 61 is incident to the second extinction chamber 2652. Additionally, a width of the second extinction chamber 2652 is narrowed, which can shorten the time for each reflection of the stray light in the second extinction chamber 2652, and improve the number of reflections of the stray light in the second extinction chamber 2652 to achieve better extinction.

In one embodiment, inner side wall surfaces of the first extinction chamber 2651 and the second extinction chamber 2652 are coated with an extinction material. Two extinction methods of reflective extinction and absorption extinction can be used simultaneously in the first extinction chamber 2651 and the second extinction chamber 2652 to eliminate the stray light, thereby achieving better extinction. The extinction material can be aluminum stearate, zinc, calcium salt, tung oil, wax, and other materials.

In an exemplary embodiment, the inner side wall surfaces of the first extinction chamber 2651 and the second extinction chamber 2652 are coated with an extinction paint. The extinction paint has a low reflection effect on a certain light via a microscopic particulated surface or a densely porously packed structure, so as to achieve absorption and extinction.

In another exemplary embodiment, the inner side wall surfaces of the first extinction chamber 2651 and the second extinction chamber 2652 adopt a metal matte black anodizing process to reduce light reflectance and achieve absorption and extinction.

Still referring to FIGS. 19 and 20, the extinction system 300 can further include a first plate body 271. One end of the optical assembly 60 away from the light-transmitting sheet 220 is arranged on the first plate body 271. One end of the hollow chamber 261 away from the third opening 212 is connected to the first plate body 271. One end of the hollow chamber 261 away from the third opening 212 is capped by the first plate body 271. The hollow chamber 261 can be enclosed by the first plate body 271, so that the optical assembly 60 is in the enclosed hollow chamber 261. Taking a space excluding the hollow chamber 261 in the receiving chamber 211 as a remaining space as an example, a space within the hollow chamber 261 is isolated from the remaining space, so that a stray light in the space excluding the hollow chamber 261 in the receiving chamber 211 can be prevented from being incident to the hollow chamber 261. A device within the remaining space is not needed to be extinguished, which can reduce product costs.

In one embodiment, the housing 210 can include a first housing and a second housing arranged opposite to the first housing. The first housing can be connected to the second housing and form the receiving cavity 211. The third opening 212 is provided on one side of the first housing away from the second housing. The light-transmitting sheet 220 is capped at the third opening 212 on the first housing. In some embodiments, the first housing can be detachably connected to the second housing for ease of installation. For example, the first housing can be detachably connected to the second housing by a screw or a bolt, etc.

Further, a sealing ring can be provided at a connecting part of the first housing and the second housing. The connecting part of the first housing and the second housing is sealed with the sealing ring to prevent moisture from entering the receiving cavity. The sealing ring can be a rubber sealing ring, a plastic sealing ring, or a metal sealing ring.

In one embodiment, the extinction system further includes an extinction cotton located on one side of the light-transmitting sheet 220 close to the third light-blocking structure 26. The extinction cotton is arranged around a peripheral side of the light-transmitting sheet at an edge of the light-transmitting sheet 220. It can be understood that the extinction cotton can eliminate a stray light from an edge region of the light-transmitting sheet 220, so that a surface of a connecting part of the housing 210 and the light-transmitting sheet 220 need not be extinguished. Therefore, the housing 210 can be manufactured in an injection molded manner to reduce production costs. The extinction cotton is generally annular in shape. The extinction cotton has an opening hole for a light ray to pass through. The light ray is incident to or emergent out of the receiving cavity 211 via the opening hole. A specific size and a shape of the opening hole can be designed according to an optical path of the optical assembly 60 to avoid affecting normal operation of an optical assembly.

EXAMPLE 4

Example 4 of the present application further provides a laser ranging device. As shown in FIGS. 17 to 21, the laser ranging device includes a plurality of optical assemblies 60. The plurality of optical assemblies 60 includes at least one laser emitting module 23 and at least one laser receiving module 24. The laser ranging device further includes an extinction system 300 according to any one of embodiments of Example 4. A plurality of third light-blocking structures 26 are provided. Each of the optical assemblies 60 is housed in a hollow chamber 261 formed by the third light-blocking structures 26 in one-to-one correspondence. The stray light is blocked from being incident to the corresponding optical assembly 60 via the third light-blocking structures 26.

The laser ranging device can be a LIDAR. The laser emitting module 23 is configured to generate a laser beam. The laser beam is configured as a detection light beam to be incident to a target object in a detection area according to a preset detecting field-of-view angle. The laser receiving module 24 configured to receive a detection echo light beam reflected back from a target object and output corresponding electrical signals. Then, a signal processing device appropriately processes the electrical signals corresponding to the detection echo light beam to form a point cloud map. By processing the point cloud map, distance, azimuth, height, speed, attitude, shape, and other parameters of the target object can be obtained, thus realizing a laser detection function, which can be applied to navigation avoidance, obstacle recognition, ranging, speed measurement, autonomous driving, and other scenarios of an automobile, a robot, a logistics vehicle, a patrol vehicle, and other products.

Further, two laser emitting modules 23 are provided. One laser receiving modules 24 is provided. Three third light-blocking structures 26 are provided. The two third light-blocking structures 26 for accommodating the two laser emitting modules 23 are located on two opposite sides of the third light-blocking structure 26 for accommodating the laser receiving module 24. The two laser emitting modules 23 are located at opposite sides of the laser receiving module 24, respectively. A combination of emitted field of views α of the two laser emitting modules 23 matches a received field of view β of the laser receiving modules 24.

It should be noted that an arrangement of the two laser emitting modules 23 can be made more flexible than the related art where the emitted field of view α of one laser emitting module 23 matches the received field of view β of one laser receiver module 24. Further, miniaturized design of the laser ranging device can be achieved. The arrangement of the two laser emitting modules 23 can also improve a field-of-view receiving rate of the laser receiving module 24, and expand a detected field of view of the laser ranging device. The two laser emitting modules 23 are located on opposite sides of the laser receiving module 24, respectively. Therefore, the emitted field of views α of the two laser emitting modules 23 are roughly distributed at both sides of the laser receiving module 24, so as to facilitate reception of the laser receiving module 24, and facilitate adjustment of the emitted field of view of the at least one laser emitting module 23. Therefore, the emitted field of views α of the two laser emitting modules 23 have an overlapping region in a middle thereof, so that the emitted field of views α fills the entire received field of view β of the laser receiving module 24, thereby avoiding a detection blind spot.

It is noted that the two laser emitting modules 23 can be the same or different. When the two laser emitting modules 23 are the same, assembly, positioning, and other operations are more convenient than when the two laser emitting modules 23 are different because the parameters of the two laser emitting modules 23 are the same. When the two laser emitting modules 23 are different, the combined form of the two laser emitting modules 23 can be made more diverse, thereby enabling more usage scenarios to be satisfied.

In some embodiments, each of the third light-blocking structures 26 includes a first light-blocking portion 262 and a second light-blocking portion 263. The first light-blocking portion 262 has a first hollow chamber 2621 extending in a first preset direction XX. An inner side wall surface of the first hollow chamber 2621 is arranged around an outer periphery of one end of the optical assembly 60 close to a third opening 212. One end of the first hollow chamber 2621 close to the third opening 212 is attached to a light-transmitting sheet 220. The second light-blocking portion 263 is connected to the first light-blocking portion 262. The second light-blocking portion 263 has a second hollow chamber 2631 extending in the first preset direction XX. An inner side wall surface of the second hollow chamber 2631 is arranged around an outer periphery of one end of the optical assembly 60 away from the light-transmitting sheet 220. The second light-blocking portion 263 is configured to be connected to one end of the first hollow chamber 2621 away from the third opening 212. When the second light-blocking portion 263 is connected to the first light-blocking portion 262, the second hollow chamber 2631 and the first hollow chamber 2621 are communicated to form the hollow chamber 261.

The plurality of first light-blocking units 262 corresponding to the plurality of third light-blocking structures 26 are unitary structures. That is, the plurality of first light-blocking portions 262 are integrally formed so as to facilitate processing and assembly. The plurality of second light-blocking portions 263 corresponding to the plurality of third light-blocking structures 26 are unitary structures. That is, the plurality of second light-blocking portions 263 are integrally formed so as to facilitate processing and assembly.

Further, the plurality of first light-blocking portions 262 can be integrally formed with the first housing.

In some embodiments, a portion of structures of the two adjacent first light-blocking portions 262 can be shared. A portion of structures of the two adjacent second light-blocking portions 263 can also be shared.

Referring to FIG. 17, the laser emitting module 23 includes a laser emitter 232 and a laser emitting lens 231. The laser receiving module 24 includes a laser detector 242 and a receiving lens 241. The laser ranging device further includes a first plate body 271. The laser emitter 232 and the laser detector 242 are arranged on the first plate body 271. One end of the hollow chamber 261 away from the third opening 212 is connected to the first plate body 271. One end of the hollow chamber 261 away from the third opening 212 is capped by the first plate body 271.

It should be noted that the laser emitter 232 and the laser detector 242 are light devices 61 in Example 1. The laser emitting lens 231 and the receiving lens 241 are optical modules 100 in Example 1. The laser emitter 232 is configured to emit a light ray. The laser emitting lens 231 is located on an emergent light side of the laser emitter 232 to be able to perform optical processing such as convergence of the light ray emitted by the laser emitter 232 to enhance intensity of a light ray within the emitted field of view α and improve detection accuracy of the laser ranging device. The receiving lens 241 is located on an incident light surface of the laser detector 242 to be able to perform optical processing such as convergence of a detection echo light beam reflected back from the target object to enhance intensity of a light ray in the received field of view β and improve the detection accuracy of the laser ranging device.

Still referring to FIG. 17, the first plate body 271 is a carrying circuit board. The laser emitter 232 and the laser detector 242 can both be electrically connected to the carrying circuit board. The carrying circuit board can be configured to carry the laser emitter 232 and provide power-supply signals, control signals and the like for the laser emitter 232. The carrying circuit board can also be configured to carry the laser detector 242 and provide the power-supply signals, the control signals and the like for the laser detector 242.

Referring to FIG. 17, the laser ranging device further includes a control chip (not shown in the figure) and a main control circuit board 51. The main control circuit board 51 is electrically connected to the carrying circuit board to realize electrical connection of the control chip with the laser emitter 232 and the laser detector 242. The control chip can control operation of the laser emitter 232 and the laser detector 242 via the carrying circuit board. The main control circuit board 51 can also be electrically connected to an interface of the laser ranging device, and can realize power supply and/or communication via an electrical connection of the interface and an external connector. The main control circuit board 51 and the interface can be connected by using a connector assembly such as a flexible wiring.

Still referring to FIG. 17, the laser ranging device further includes a transfer circuit board 52. The carrying circuit board can be electrically connected to the main control circuit board 51 via the transfer circuit board 52.

In one embodiment, one light-transmitting sheet 220 is correspondingly arranged with the plurality of hollow chambers 261 of the plurality of light-blocking structures 13. Therefore, integrity and simplicity of the structure are ensured. Assembly steps can be saved, and assembly efficiency can be improved. At this time, only one piece of extinction cotton can be arranged. The extinction cotton is arranged along a peripheral side of the light-transmitting sheet 220 at an edge of the light-transmitting sheet 220.

Figure 22:
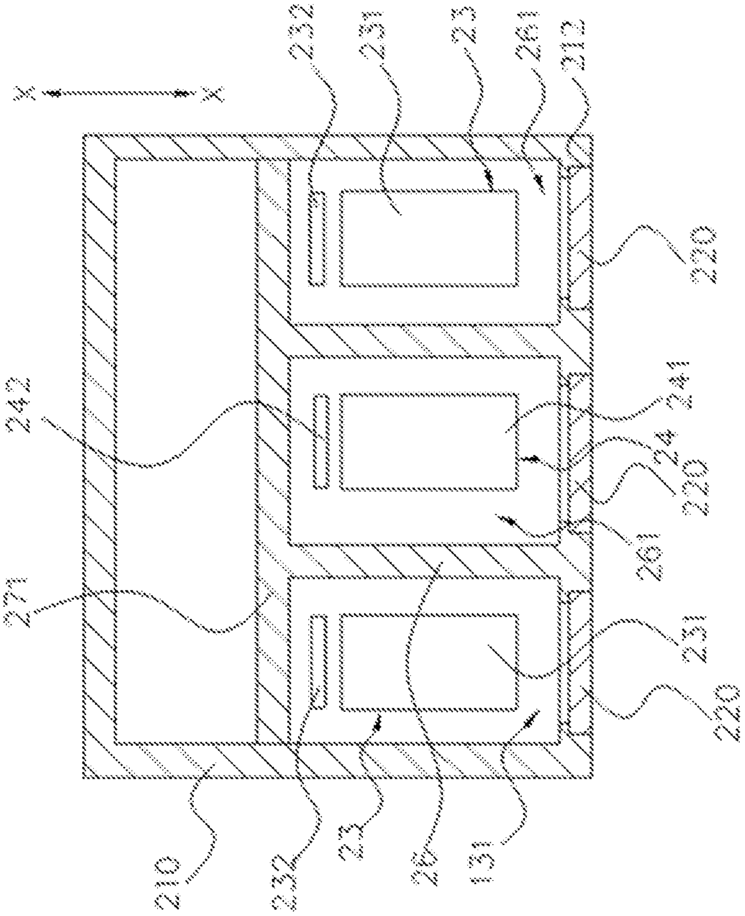
FIG. 22 is a structural schematic diagram of an inner of a housing according to an embodiment of the present application.

In another embodiment, as shown in FIG. 22, the light-transmitting sheet 220 includes a plurality of light-transmitting films corresponding to the plurality of third light-blocking structures 26 in one-to-one correspondence. The plurality of light-transmitting films are configured to allow a light ray to be incident to or emergent out of the hollow chamber 261 formed by the third light-blocking structures 26 in one-to-one correspondence. Therefore, the number of the light-transmitting films can be reduced, and production costs can be reduced. Optical crosstalk between the laser emitting module 23 and the laser receiving module 24 can be reduced. At this time, the extinction cotton corresponding to the light-transmitting films in one-to-one correspondence can be arranged. The extinction cotton is arranged along the peripheral side of the light-transmitting film at the edge of the corresponding light-transmitting film.

In one embodiment, the light-transmitting sheet 220 can also have a light filtering effect. That is, the light-transmitting sheet 220 can be used as a light filtering sheet to enable filtering of a light ray with non-working bands.

Figure 23:
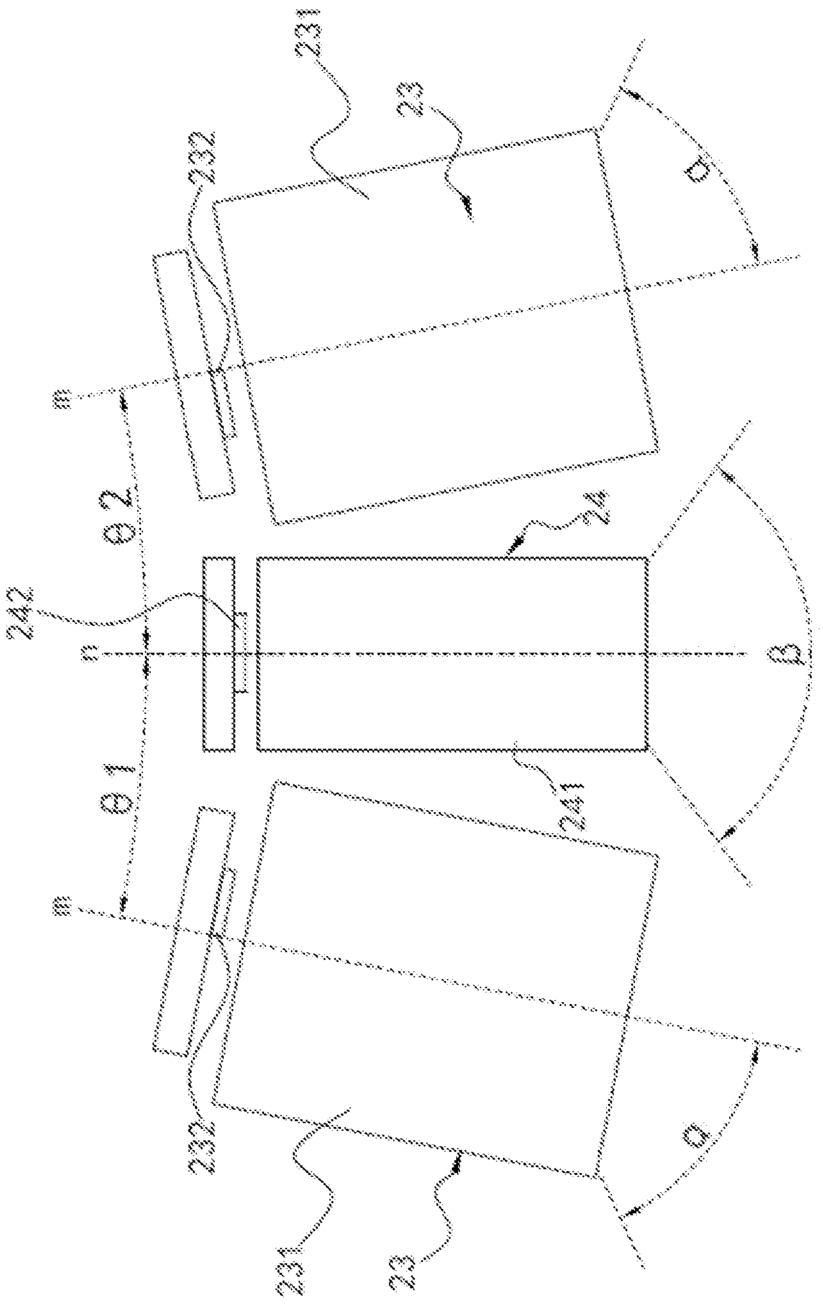
FIG. 23 is a distribution schematic diagram of a laser emitting module and a laser receiving module according to an embodiment of the present application.

As shown in FIG. 23, the emitting lens 231 can have a first optical axis m. Centers of the laser emitters 232 of the two laser emitting modules 23 can be located on one side of the respective first optical axis m close to the laser receiving module 24. Therefore, most of the light rays emitted by the laser emitter 232 are emergent out via the emitting lens 231 and co-located with the laser emitting module 23 on the same side of the laser receiving module 24. For example, when the two laser emitting modules 23 are located on a left side and a right side of the laser receiving module 24, respectively, the laser emitter 232 of the laser emitting module 23 on the left side can be arranged close to a right side of a first optical axis m of the laser emitting module 23 on the left side. Therefore, an emitted field of view α of the laser emitting module 23 on the left side is mainly distributed to the left side of the laser receiving module 24. Similarly, the laser emitter 232 of the laser emitting module 23 on the right side can be arranged at the left side of the first optical axis m close to the laser emitting module 23 on the right side. Therefore, the emitted field of view α of the laser emitting module 23 on the right side is mainly distributed at the right side of the laser receiving module 24. After being combined, the emitted field of view α of the laser emitting module 23 on the left side and the emitted field of view α of the laser emitting module 23 on the right side can roughly match the received field of view β of the laser receiving module 24. Therefore, the emitted field of view α of the laser emitting module 23 on the left side and the emitted field of view α of the laser emitting module 23 on the right side are not overlapped in a large region, resulting in an energy waste phenomenon.

It should be noted that even if the laser emitters 232 of the two laser emitting modules 23 are located on one side of the respective first optical axis m close to the laser receiving module 24, it is necessary to ensure that the emitted field of views α of the two laser emitting modules 23 has an overlapping region, so as to avoid a blind field of view in an intermediate region.

During assembly of the laser ranging device, the two laser emitters 232 can first be prepositioned so that the respective emitted field of views α of the two laser emitters are located on one side of the corresponding first optical axis m away from the laser receiving module 24. Then, a middle of the two emitted field of views α has an overlapping region by fine-tuning the at least one of the laser emitters 232.

In other embodiments, the centers of the laser emitters 232 of the two laser emitting modules 23 can be located on one side of the respective first optical axis m away from the laser receiving module 24. Therefore, most of the light rays emitted by the two laser emitters 232 are cross-emitted after being emergent out via the emitting lens 231. For example, when the two laser emitting modules 23 are located on the left side and the right side of the laser receiving module 24, respectively, the laser emitter 232 of the laser emitting module 23 on the left side can be arranged close to the left side of the first optical axis m of the laser emitting module 23 on the left side. Therefore, the emitted field of view α of the laser emitting module 23 on the left side is mainly distributed to the right side of the laser receiving module 24. Similarly, the laser emitter 232 of the laser emitting module 23 on the right side can be arranged at the right side of the first optical axis m close to the laser emitting module 23 on the right side. In this way, the emitted field of view α of the laser emitting module 23 on the right side is mainly distributed on the left side of the laser receiving module 24. Thus, light rays emitted by the emitted field of view α of the laser emitting module 23 on the left side and the laser emitting module 23 on the right side are crossed and emitted after being emergent out of the emitting lens 231. The emitted field of views α of the plurality of emitting modules have an overlapping region. The overlapping region covers a center field of view, so that when the LIDAR measures at a close range, even if a pixel shift is provided, a center region of the target object is still illuminated by laser, so that a point cloud is provided in a center field of view of the receiving module, thereby effectively avoiding a phenomenon of a missing point cloud in the center field of view of the receiving module.

Referring to FIG. 23, in some embodiments, centers of the laser emitters 232 of the two laser emitting modules 23 can also be located at respective first optical axis m. Therefore, the emitted field of views α of the two laser emitting modules 23 are substantially symmetrically distributed at both sides of the respective first optical axis m. The two laser emitting modules 23 and the laser receiving module 24 are conveniently assembled and positioned.

The first optical axis m of the two laser emitting modules 23 and a second optical axis n of the laser receiving module 24 can be located in the same plane. In this way, a relative distance between the two laser emitting modules 23 and the laser receiving module 24 is conveniently calculated when being assembled. Difficulty of assembling is reduced. More light rays within the emitted field of view α are advantageously received by the laser receiving module 24, thereby improving a light ray utilization rate within the emitted field of view α.

In some embodiments, the first optical axis m of the two laser emitting modules 23 can be parallel to the second optical axis n of the laser receiving module 24. In this way, the laser ranging device can be made more structured, aesthetically pleasing, and less difficult to be assembled. Further, the first optical axis m of the two laser emitting modules 23 can be symmetrically arranged relative to the second optical axis n of the laser receiving module 24. In this way, for selecting two identical laser emitting modules 23, the emitted field of views α of the two laser emitting modules 23 can be symmetrically distributed on both sides of the laser receiving module 24, which can further reduce computational difficulty of a relative distance of the two laser emitting modules when the two laser emitting modules are assembled, and facilitate assembly of the two laser emitting modules.

Figure 24:
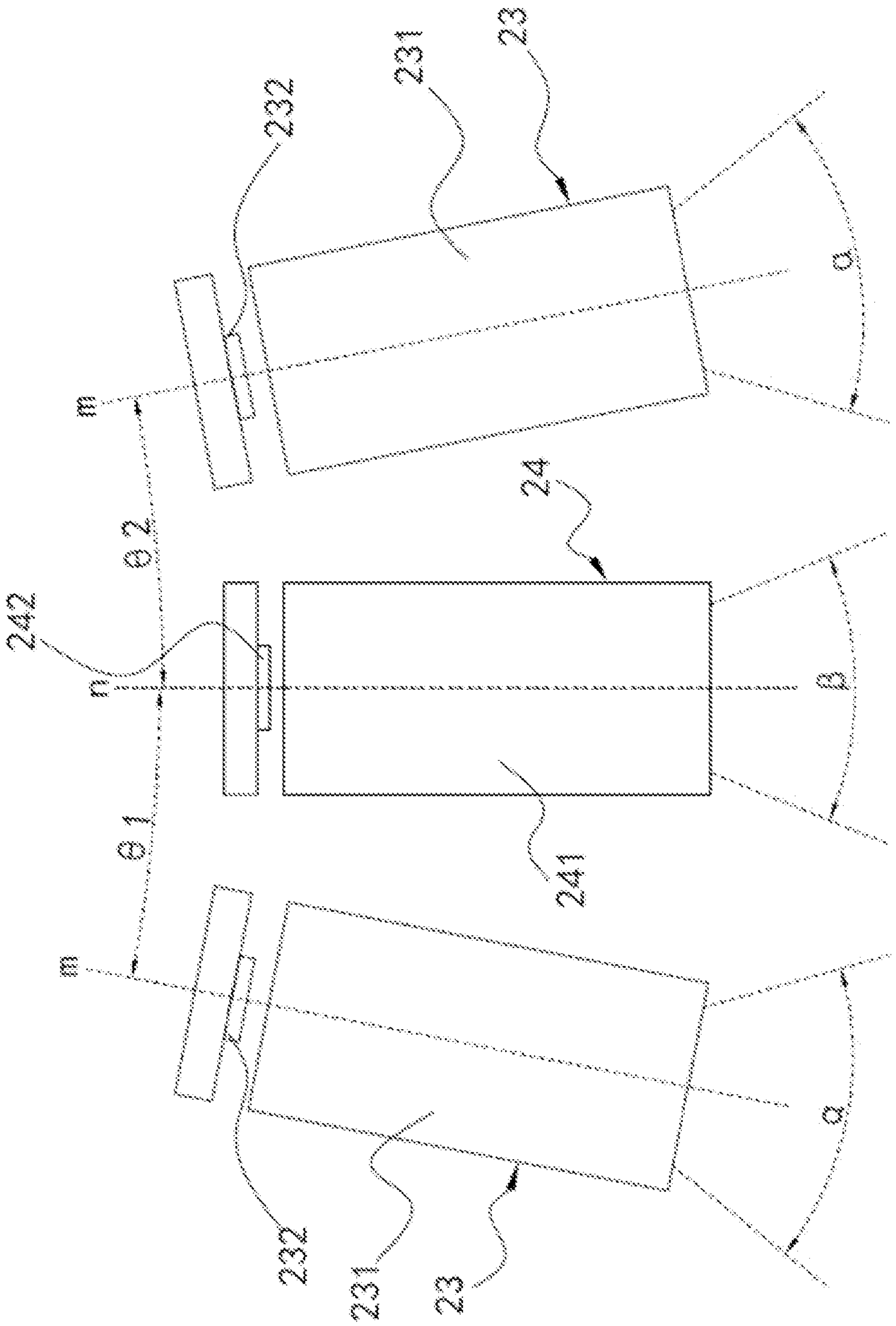
FIG. 24 is a distribution schematic diagram of a laser emitting module and a laser receiving module according to another embodiment of the present application.

In another embodiment, referring to FIGS. 23 and 24, the first optical axes m of the two laser emitting modules 23 can both be at an included angle with the second optical axis n of the laser receiving module 24. Therefore, a combination between the laser emitting module 23 and the laser receiving module 24 can be made more diverse and convenient to be assembled. In some embodiments, an included angle between the first optical axis m of any of the laser emitting modules 23 and the second optical axis n of the laser receiving module 24 can be greater than 0° and less than 90°.

It should be noted that the included angles between the first optical axis m of the two laser emitting modules 23 and the second optical axis n of the laser receiving module 24 can be equal or different. For example, where the included angle between the first optical axis m of one of the laser emitting modules 23 and the second optical axis n of the laser receiving module 24 θ1. The included angle of the first optical axis m of the other one of the laser emitting modules 23 and the second optical axis n of the laser receiving module 24 θ2. θ1 and θ2 can be equal or different. In some embodiments, θ1 and θ2 are equal. That is, the first optical axis m of the two laser emitting modules 23 is symmetrically arranged relative to the second optical axis n of the laser receiving module 24. In this way, for selecting two identical laser emitting modules 23, the emitted field of views α of the two laser emitting modules 23 can be symmetrically distributed on both sides of the laser receiving module 24, which can further reduce the computational difficulty of the relative distance of the two laser emitting modules when the two laser emitting modules are assembled, and facilitate the assembly of the two laser emitting modules.

In yet another embodiment, within the two laser emitting modules 23, one of the two first optical axes m can be at an included angle with the second optical axis n of the laser receiving module 24, and the other first optical axis m can be parallel with the second optical axis n. Arrangement of the laser emitting module 23 and the laser receiving module 24 of the example of the present application is diverse, and can be flexibly selected according to actual use needs, with a wide range of usage prospects.

In Example 4 of the present application, the emitted field of view α of the laser emitting module 23 can be generally a rectangular pyramid. The received field of view β of the laser receiving module 24 can be generally a rectangular pyramid. The rectangular-pyramid field of view can be roughly divided into a lateral field of view and a longitudinal field of view. A combination of the emitted field of view α of the two laser emitting modules 23 matches the received field of view β of the laser receiving modules 24 as follows: a combination of lateral emitted field of views α of the two laser emitting modules 23 matches a lateral received field of view β of the laser receiving modules 24, and a combination of longitudinal emitted field of views α of the two laser emitting modules 23 matches a longitudinal received field of view β of the laser receiving module 24.

The forgoing are only exemplary embodiments of this application and are not intended to limit this application. Any modification, equivalent replacement and improvement made within the spirit and principle of this application shall be included within the protection scope of this application.

What is claimed is:

1. A laser ranging device, comprising:

a housing having an accommodation chamber, wherein one side of the housing is provided with a third opening;

a light-transmitting sheet capped at the third opening for allowing a light ray to be incident to or emergent out of a receiving cavity;

a laser emitting module located within the receiving cavity, and comprising a laser emitting lens and a laser emitter; and a laser receiving module located within the receiving cavity, and comprising a laser receiving lens and a laser detector, wherein the laser emitting lens adopts an optical module, the optical module is located on an emergent light side of the laser emitter and emits laser via the light-transmitting sheet; or, the laser receiving lens adopts the optical module, the optical module is located on an incident light side of the laser detector and receives echo laser via the light-transmitting sheet, wherein the optical module, comprising:

a first structure member having a light-transmitting cavity; and an optical element arranged within the light-transmitting cavity, wherein the first structure member further has a first end surface, a second end surface, and an inner wall surface; a first through hole and a second through hole in communication with the light-transmitting cavity are arranged on the first end surface and the second end surface, respectively; the inner wall surface is configured to form the light-transmitting cavity; a first extinction structure is arranged on the first end surface or the second end surface for blocking a stray light incident to the first end surface or the second end surface; and wherein the optical module further comprises a second extinction structure; the inner wall surface comprises a bearing wall surface for bearing against the optical element and a vacant wall surface not bearing against the optical element, the second extinction structure is arranged on at least a portion of the vacant wall surface, the second extinction structure comprises a first light-blocking structure, the first light-blocking structure comprises a plurality of first light-blocking sheets, and the plurality of first light-blocking sheets are arranged and spaced apart in a first preset direction and extend in a circumferential direction along at least a portion of the vacant wall surface.

2. The laser ranging device according to claim 1, wherein a protection window is provided on the laser detector and covers the laser detector, and the protection window is coated with a light filtering material.

3. The laser ranging device according to claim 1, further comprising:

a third light-blocking structure located within the receiving cavity, wherein the third light-blocking structure has a hollow chamber extending in a first preset direction, the hollow chamber is configured to be arranged with the optical module, and the light ray is incident to or emergent out of the hollow chamber via the light-transmitting sheet;

wherein an inner side wall surface of the hollow chamber is arranged around an outer periphery of the optical module, and one end of the hollow chamber close to the third opening is attached to the light-transmitting sheet to prevent a stray light from being incident to the optical module; and wherein a plurality of third light-blocking structures are provided; each of the optical modules is arranged in the hollow chamber formed by the third light-blocking structures in one-to-one correspondence, respectively, and the stray light is blocked from being incident to the corresponding optical modules via the third light-blocking structure.

4. The laser ranging device according to claim 1, wherein the laser ranging device comprises two laser emitting modules and one laser receiving module, wherein the two laser emitting modules are located on two opposite sides of the laser receiving module, and a combination of emitting field of views of the two laser emitting modules matches a receiving field of view of the laser receiving module.

* * * * *